(12) United States Patent
Varghese et al.

(10) Patent No.: US 8,484,455 B2
(45) Date of Patent: Jul. 9, 2013

(54) ONLINE DATA ENCRYPTION AND DECRYPTION

(75) Inventors: Thomas Emmanual Varghese, San Mateo, CA (US); Steven Lucas Harris, Foster City, CA (US); Jon Bryan Fisher, Moss Beach, CA (US); Don Bosco Durai, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 12/882,096

(22) Filed: Sep. 14, 2010

(65) Prior Publication Data
US 2011/0055548 A1 Mar. 3, 2011

Related U.S. Application Data

(60) Division of application No. 11/318,424, filed on Dec. 22, 2005, now Pat. No. 7,822,990, which is a continuation of application No. 11/169,564, filed on Jun. 29, 2005, now Pat. No. 7,616,764.

(60) Provisional application No. 60/585,818, filed on Jul. 7, 2004.

(51) Int. Cl.
*G06F 21/00* (2006.01)
*H04K 1/00* (2006.01)
*G09C 3/00* (2006.01)
*G09C 5/00* (2006.01)

(52) U.S. Cl.
USPC ........... 713/150; 713/182; 713/183; 713/184; 380/54; 380/56

(58) Field of Classification Search
None
See application file for complete search history.

(56) References Cited

U.S. PATENT DOCUMENTS

D95,205 S 4/1935 Harrison
D298,837 S 12/1988 Thomas
(Continued)

FOREIGN PATENT DOCUMENTS

EP 1 615 181 A1 1/2006
GB 2 313 460 A 5/1997
(Continued)

OTHER PUBLICATIONS

Birget et al., "The Graphical Passwords Project," printed from website http://clam.rutgers.edu/~birget/grPssw/, on Nov. 26, 2007; 2 pages.
(Continued)

*Primary Examiner* — Shin-Hon Chen
(74) *Attorney, Agent, or Firm* — Kilpatrick Townsend & Stockton LLP

(57) ABSTRACT

Systems and methods for providing encryption and decryption of data transmitted on a computer implemented network, preferably user authentication identifier data, such as a password, at the point of entry into the user's computer. The systems and methods enable an end user to mentally select a marker from one of the randomly arranged elements on a first portion of a graphical image. A second portion of the graphical image includes an arrangement of possible elements of any individual authentication identifier sequence, and is positioned adjacent to the first portion. The systems and methods prompt a user to enter each element of the identifier by moving the selected marker and the first portion as necessary to substantially align the selected marker with a chosen element of the authentication identifier appearing on the outer portion. According to one embodiment, the image portions are concentric wheels. According to another embodiment, the image portions are arranged in adjacent rows.

17 Claims, 34 Drawing Sheets

U.S. PATENT DOCUMENTS

| | | | |
|---|---|---|---|
| 5,416,895 A | 5/1995 | Anderson et al. | |
| 5,428,349 A | 6/1995 | Baker | |
| 5,452,413 A | 9/1995 | Blades | |
| 5,555,365 A | 9/1996 | Selby et al. | |
| 5,559,961 A | 9/1996 | Blonder | |
| 5,572,644 A | 11/1996 | Liaw et al. | |
| 5,577,125 A * | 11/1996 | Salahshour et al. | 380/54 |
| 5,604,854 A | 2/1997 | Glassey | |
| 5,623,591 A | 4/1997 | Cseri | |
| 5,664,099 A | 9/1997 | Ozzie et al. | |
| 5,798,760 A | 8/1998 | Vayda et al. | |
| D400,195 S | 10/1998 | Utesch | |
| 5,821,933 A | 10/1998 | Keller et al. | |
| 5,875,296 A | 2/1999 | Shi et al. | |
| 5,928,364 A | 7/1999 | Yamamoto | |
| 5,949,348 A | 9/1999 | Kapp et al. | |
| 5,966,127 A | 10/1999 | Yajima | |
| D419,907 S | 2/2000 | Vogelbruch | |
| 6,023,506 A * | 2/2000 | Ote et al. | 713/165 |
| 6,064,972 A | 5/2000 | Jankowitz et al. | |
| 6,111,984 A | 8/2000 | Fukasawa | |
| 6,209,102 B1 | 3/2001 | Hoover | |
| 6,209,104 B1 | 3/2001 | Jalili | |
| 6,240,183 B1 | 5/2001 | Marchant | |
| 6,253,326 B1 | 6/2001 | Lincke et al. | |
| 6,263,447 B1 | 7/2001 | French et al. | |
| 6,282,551 B1 | 8/2001 | Anderson et al. | |
| 6,343,361 B1 | 1/2002 | Nendell et al. | |
| 6,369,839 B1 | 4/2002 | Peterson | |
| 6,448,987 B1 | 9/2002 | Easty et al. | |
| 6,658,574 B1 | 12/2003 | Anvekar | |
| 6,718,471 B1 | 4/2004 | Kashima | |
| 6,720,860 B1 | 4/2004 | Narayanaswami | |
| 6,725,422 B1 | 4/2004 | Bauchot et al. | |
| 6,741,268 B1 | 5/2004 | Hayakawa | |
| D492,691 S | 7/2004 | Kortis | |
| D493,471 S | 7/2004 | McIntosh | |
| 6,853,973 B2 | 2/2005 | Mathews et al. | |
| D505,135 S | 5/2005 | Sapp et al. | |
| 6,895,502 B1 | 5/2005 | Fraser | |
| 6,895,558 B1 | 5/2005 | Loveland | |
| 6,934,860 B1 | 8/2005 | Goldstein | |
| 6,972,363 B2 | 12/2005 | Georges et al. | |
| 7,007,298 B1 | 2/2006 | Shinzaki et al. | |
| 7,036,091 B1 * | 4/2006 | Nguyen | 715/834 |
| 7,054,819 B1 | 5/2006 | Loveland | |
| 7,082,227 B1 | 7/2006 | Baum et al. | |
| 7,100,049 B2 | 8/2006 | Gasparini et al. | |
| 7,137,008 B1 | 11/2006 | Hamid et al. | |
| D539,809 S | 4/2007 | Totten et al. | |
| 7,200,747 B2 | 4/2007 | Riedel et al. | |
| 7,219,368 B2 | 5/2007 | Juels et al. | |
| 7,237,264 B1 | 6/2007 | Graham et al. | |
| 7,240,367 B2 | 7/2007 | Park | |
| 7,437,024 B2 | 10/2008 | Baum et al. | |
| 7,523,067 B1 | 4/2009 | Nakajima | |
| 7,586,635 B2 | 9/2009 | Maeda et al. | |
| 7,596,701 B2 | 9/2009 | Varghese | |
| 7,616,764 B2 | 11/2009 | Varghese | |
| 7,822,990 B2 | 10/2010 | Varghese et al. | |
| 2001/0027529 A1 * | 10/2001 | Sasabe et al. | 713/202 |
| 2002/0013905 A1 | 1/2002 | Hamada | |
| 2002/0029341 A1 | 3/2002 | Juels et al. | |
| 2002/0049614 A1 | 4/2002 | Rice et al. | |
| 2002/0087894 A1 | 7/2002 | Foley et al. | |
| 2002/0122031 A1 * | 9/2002 | Maglio et al. | 345/184 |
| 2002/0188872 A1 * | 12/2002 | Willeby | 713/202 |
| 2003/0005329 A1 | 1/2003 | Ikonen | |
| 2003/0018558 A1 | 1/2003 | Heffner et al. | |
| 2003/0097593 A1 | 5/2003 | Sawa et al. | |
| 2003/0159050 A1 | 8/2003 | Gantman et al. | |
| 2003/0182558 A1 | 9/2003 | Lazzaro et al. | |
| 2003/0210127 A1 * | 11/2003 | Anderson | 340/5.27 |
| 2004/0010721 A1 | 1/2004 | Kirovski et al. | |
| 2004/0030933 A1 | 2/2004 | Park | |
| 2004/0030934 A1 * | 2/2004 | Mizoguchi et al. | 713/202 |
| 2004/0034801 A1 | 2/2004 | Jaeger | |
| 2004/0059951 A1 * | 3/2004 | Pinkas et al. | 713/202 |
| 2004/0073809 A1 | 4/2004 | Wing Keong | |
| 2004/0083389 A1 | 4/2004 | Yoshida | |
| 2004/0117320 A1 | 6/2004 | Morioka et al. | |
| 2004/0128534 A1 | 7/2004 | Walker | |
| 2004/0153660 A1 | 8/2004 | Gaither et al. | |
| 2004/0168083 A1 | 8/2004 | Gasparini et al. | |
| 2004/0215980 A1 | 10/2004 | Hamid | |
| 2004/0221163 A1 | 11/2004 | Jorgensen | |
| 2004/0230843 A1 | 11/2004 | Jansen | |
| 2004/0250138 A1 | 12/2004 | Schneider | |
| 2005/0010768 A1 * | 1/2005 | Light et al. | 713/168 |
| 2005/0015601 A1 | 1/2005 | Tabi | |
| 2005/0044425 A1 | 2/2005 | Hypponen | |
| 2005/0097320 A1 | 5/2005 | Golan et al. | |
| 2005/0097339 A1 | 5/2005 | Wiley et al. | |
| 2005/0144451 A1 | 6/2005 | Voice et al. | |
| 2005/0193208 A1 * | 9/2005 | Charrette et al. | 713/182 |
| 2005/0204131 A1 | 9/2005 | Kovarik | |
| 2005/0204145 A1 | 9/2005 | Makishima | |
| 2005/0251752 A1 | 11/2005 | Tan et al. | |
| 2005/0278542 A1 | 12/2005 | Pierson et al. | |
| 2005/0278647 A1 | 12/2005 | Leavitt et al. | |
| 2006/0011045 A1 | 1/2006 | Yamashita et al. | |
| 2006/0212829 A1 | 9/2006 | Yahiro et al. | |
| 2006/0282660 A1 | 12/2006 | Varghese et al. | |
| 2006/0288225 A1 | 12/2006 | Jung et al. | |
| 2007/0028111 A1 | 2/2007 | Covely | |
| 2007/0036314 A1 | 2/2007 | Kloberdans et al. | |
| 2007/0097351 A1 | 5/2007 | York et al. | |
| 2007/0165849 A1 | 7/2007 | Varghese et al. | |
| 2007/0169190 A1 | 7/2007 | Kolton et al. | |
| 2007/0211925 A1 | 9/2007 | Aoki et al. | |
| 2008/0209526 A1 | 8/2008 | Varghese et al. | |
| 2009/0089869 A1 | 4/2009 | Varghese et al. | |

FOREIGN PATENT DOCUMENTS

| | | |
|---|---|---|
| JP | 2002-222172 A | 8/2002 |
| JP | 2004-2588845 A | 9/2004 |
| WO | WO 96-18139 A1 | 6/1996 |
| WO | WO01/18636 A1 | 3/2001 |
| WO | WO0165375 A1 | 9/2001 |
| WO | WO 01/98912 A1 | 12/2001 |
| WO | WO 2004/027632 A1 | 4/2004 |
| WO | WO 2004/042550 A1 | 5/2004 |
| WO | WO 2004-053674 A2 | 6/2004 |
| WO | WO2005025292 A2 | 3/2005 |
| WO | WO 2006-010058 A2 | 1/2006 |
| WO | WO 2006-118968 A2 | 11/2006 |
| WO | WO 2007-087352 A2 | 8/2007 |

OTHER PUBLICATIONS

Echo System, Identita: The Powered Card™ Identity Provider, printed from website http://222.identita.com/sol_eco_sys.html, on Nov. 26, 2007; 2 pages.

Identita Technologies Inc., "Audio Authentication Devices," 2 pages.

Frost & Sullivan, "Leading European Financial Institution Implements Voice Verification Biometrics to Enrich Customer Experience," Jul. 2006; 13 pages.

VoiceVault, VoiceVault™ World Leaders in Voice Verification, printed from website http://www.voicevault.com/ca.aspx on Nov. 13, 2007; 2 pages.

VoiceVault, VoiceVault™ World Leaders in Voice Verification, "What is 'two factor authentication'?," printed from website http://www.voicevault.com/twofactor.aspx on Nov. 13, 2007; 2 pages.

International Search Report and Written Opinion for corresponding International Application No. PCT/US2005/024376 mailed on Apr. 7, 2006, 7 pages.

International Preliminary Report on Patentability for corresponding International Application No. PCT/US2005/024376 dated Apr. 13, 2007, 4 pages.

International Search Report and Written Opinion for International Application No. PCT/US2007/01899 mailed on Feb. 14, 2008, 6 pages.

International Search Report and Written Opinion for International Application No. PCT/US06/016085 mailed on Jul. 7, 2008, 12 pages.

International Preliminary Report on Patentability for international Application No. PCT/US2006/016085 dated Aug. 28, 2008, 1 page.
International Preliminary Report on Patentability for International Application No. PCT/US2007/01899 dated Jan. 2, 2009, 10 pages.
Supplemental European Search Report for EP Application No. EP05773133 dated Nov. 5, 2010, 4 pages.
Non-Final Office Action for U.S. Appl. No. 11/340,376 mailed on Jul. 27, 2007, 7 pages.
Final Office Action for U.S. Appl. No. 11/340,376 mailed on Mar. 19, 2008, 8 pages.
Advisory Action for U.S. Appl. No. 11/340,376 mailed on May 27, 2008, 3 pages.
Non-Final Office Action for U.S. Appl. No. 11/340,376 mailed on Aug. 4, 2008, 5 pages.
Non-Final Office Action for U.S. Appl. No. 11/412,997 mailed on Sep. 30, 2008, 23 pages.
Non-Final Office Action for U.S. Appl. No. 11/169,564 mailed on Nov. 13, 2008, 7 pages.
Non-Final Office Action for U.S. Appl. No. 11/318,414 mailed on Nov. 13, 2008, 6 pages.
Non-Final Office Action for U.S. Appl. No. 11/318,424 mailed on Dec. 1, 2008, 12 pages.
Non-Final Office Action for U.S. Appl. No. 11/340,376 mailed on Jan. 15, 2009, 9 pages.
Non-Final Office Action for U.S. Appl. No. 11/318,414 mailed on Jan. 27, 2009, 7 pages.
Non-Final Office Action for U.S. Appl. No. 11/412,997 mailed on Apr. 10, 2009, 30 pages.
Notice of Allowance for U.S. Appl. No. 11/169,564 mailed on Jun. 1, 2009, 9 pages.
Final Office Action for U.S. Appl. No. 11/318,424 mailed on Jun. 2, 2009, 12 pages.
Notice of Allowance for U.S. Appl. No. 11/340,376 mailed on Jun. 12, 2009, 7 pages.
Advisory Action for U.S. Appl. No. 11/318,424 mailed on Jul. 30, 2009, 3 pages.
Non-Final Office Action for U.S. Appl. No. 11/318,424 mailed on Sep. 1, 2009, 12 pages.
Non-Final Office Action for U.S. Appl. No. 11/412,997 mailed on Nov. 16, 2009, 19 pages.
Final Office Action for U.S. Appl. No. 11/318,424 mailed on Mar. 10, 2010, 11 pages.
Non-Final Office Action for U.S. Appl. No. 11/412,997 mailed on May 11, 2010, 21 pages.
Advisory Action for U.S. Appl. No. 11/318,424 mailed on May 25, 2010, 3 pages.
Notice of Allowance for U.S. Appl. No. 11/318,424 mailed on Jun. 16, 2010, 7 pages.
Non-Final Office Action for U.S. Appl. No. 11/412,997 mailed on Sep. 13, 2010, 13 pages.
Non-Final Office Action for U.S. Appl. No. 12/001,586 mailed on Oct. 26, 2010, 10 pages.
Notice of Allowance for U.S. Appl. No. 11/412,997 mailed on Dec. 14, 2010, 6 pages.
Non-Final Office Action for U.S. Appl. No. 12/001,586 mailed on Apr. 29, 2011, 8 pages.
Final Office Action for U.S. Appl. No. 12/001,586 mailed on Oct. 27, 2011, 10 pages.
Advisory Action for U.S. Appl. No. 12/001,586 mailed on Jan. 6, 2012, 3 pages.
European Search Report for application EP06758687.5 (Mar. 14, 2012).
European Search Report for application EP11169063.2 (Mar. 21, 2012).
"ssh—OpenSSH SSH client (remote login program)" BSD General Commands Manual, from internet: http://unixhelp.ed.ac.uk/CGI/man-cgi?ssh+1 (Sep. 1999).
Non-Final Office Action for U.S. Appl. No. 12/260,544, mailed on Jun. 7, 2012.
Office Action from China Intellectual Property Office for application CN200780003321.5 (Jun. 18, 2012).
European Patent Office (EPO) Communication for European application EP11169063.2 (Nov. 2, 2012).
Final Office Action for U.S. Appl. No. 12/260,544 (Nov. 15, 2012).
Non-Final Office Action for U.S. Appl. No. 12/001,586 (Oct. 26, 2012).
European Examination Report for patent application EP5773133.3 (Apr. 10, 2012 ).
European Examination Report for patent application EP7762565.5 (Jul. 6, 2012).
"How to Set a Wallpaper on the Background of a Folder Window", Microsoft Corporation, Document No. 879735, http://support.microsoft.com/kb/879735/ja (Dec. 27, 2004).

* cited by examiner

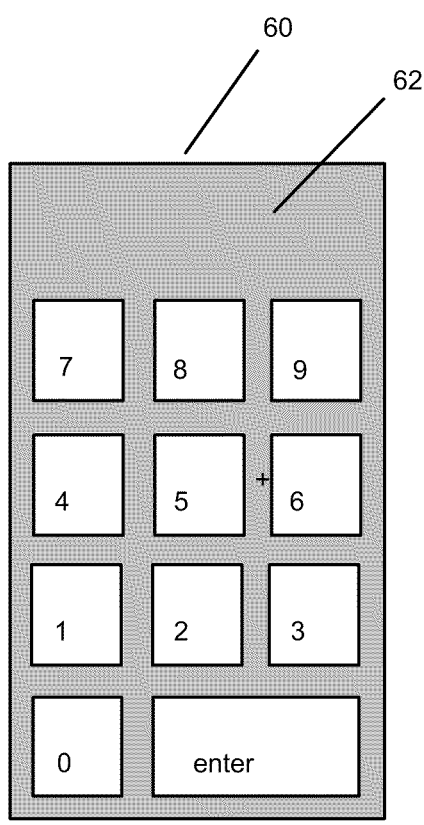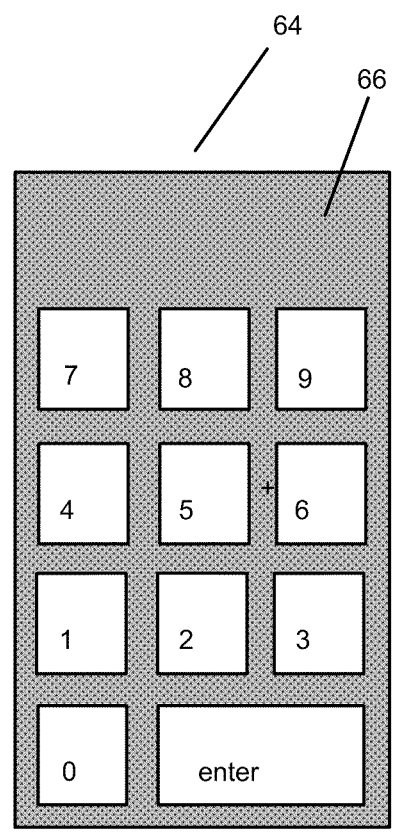
Fig. 9                    Fig. 10

Non user personalized markers

User personalized markers
(User gets the same marker list always

Client/Server Interaction
(without encryption)

Client/ Server Interaction
(with encryption)

Authentication

//Sequence of flow:
1. Login page is invoked (reference: function printLoginPage())
2. Flash client is request from the browser. Reference decompiled Flash code is part of this document.
3. Flash code makes a call to the server to get the wheel to show. Reference function genWheel generates the wheel which is formatted and given to the flash code.
4. User enters the PIN using slider
5. Flash sends the displacement to the server
6. Server code parses the http request and calls authenticatePIN function
7. Based on authenticatePIN response, user given access permission or not //HTML code snippet

```
function printLoginPage ( ) {
    //Embed the following code in the html page
        print "<html></body>
        <table width="100%" border="0" cellpadding="24" cellspacing="0">
        <tr>
                <td align="center">
                        <form method="post" action="authSimple.jsp">
                                <table>
                                        <tr>
                                                <td>Login ID:</td>
                                                <td><input type="text" name="usr" size=10></td>
                                        </tr>
                                        <tr>
                                                <td>Password:</td>
                                                <td><input type="password" name="pwd" size=10></td>
                                        </tr>
                                        <tr>
                                                <td colspan=2 align=center><input type="submit" value="Submit"></td>
                                        </tr>
                                </table>
                        </form>
                </td>
                <td>
                        <object classid="clsid:d27cdb6e-ae6d-11cf-96b8-444553540000"
codebase="http://fpdownload.macromedia.com/pub/shockwave/cabs/flash/swflash.cab#version=6,0,0,0" width="1" height="1" align="middle">
```

FIG. 29

```
                              <param name="allowScriptAccess"
value="sameDomain" />
                              <param name="movie" value="SliderBarAuth.swf"
/>
                              <param name="quality" value="high" />
                              <param name="bgcolor" value="#ffffff" />
                              <embed src="SliderBarAuth.swf" quality="high"
bgcolor="#ffffff" width="1" height="1" align="middle"
allowScriptAccess="sameDomain" type="application/x-shockwave-flash"
pluginspage="http://www.macromedia.com/go/getflashplayer" />
                         </object>
                  </td>
         </tr>
    </table>
         </body></html>
         ";
}

//code to generate the wheel markers
         function String genWheel( int length, int sets, long seed ){
                  Random rand = seed != 0 ? new Random( seed ): new Random();
                  String wheelstr = "";

int[] outerWheel = new int[length];
                  for (int i=0; i<length; i++){ outerWheel[i] = i; } wheelList = new Vector();
                  for( int wheelCount = 0; wheelCount < sets; wheelCount++ ) {
                        wheelstr += "&wheel"+wheelCount+"=";
                        int arr[] = new int[length ];

Integer newWheel[] = new Integer[ length ];

for( int i = 0; i < length; i++ ) {
                              arr[i] = 0;
                        }
                        for( int i = 0 ; i < length; i++ ) {
                              int value = rand.nextInt( length );
                              if ( arr[value] != 0 ) {
                                     --i;
                                     continue;
                              }
                              arr[value] = 1;
```

FIG. 29 CONT'D

```
                        newWheel[i] = new Integer(outerWheel[value]);
            }
            wheelstr += formatIntegerArray(newWheel);
            wheelList.add(newWheel);
    }
        return wheelstr;
}

//Authentication process
function int authenticatePin( Vector displacements, String PIN, Vector wheelList ) {
        rcode = SUCCESS;

Integer marker = null;
        for (int x=0,i =0; rcode == 0 && i<PIN.length(); i++,x++){
                Integer[] of = (Integer[])wheelList.elementAt(x);
                int offset =
((Integer)displacements.elementAt(x)).intValue();

String currchar = ""+PIN.charAt(i);
                int index = outer.indexOf(currchar);
                int bignum = 100000*outer.length();
                int m;

if (offset<0){
                        m = (offset*-1)%outer.length();
                        m = (bignum+index-offset)%outer.length();
                }
                else if (offset>0){
                        m = offset%outer.length();
                        m = (bignum+index-offset)%outer.length();
                }
                else{ m=index; } if (marker==null){
                        marker = of[m/3];
                }
                else{
                        int a = of[m/3].intValue();
                        int b = marker.intValue();

if (a != b){
                                rcode = WRONG_PIN;
                                break;
                        }
                }
```

FIG. 29 CONT'D

```
            }
        } if (rcode == SUCCESS){
          //SUCESS
        } else {
          //FAILURE
        } return rcode;
    }
}
```

```
movie 'SliderBarAuth.swf' {
// flash 6, total frames: 2, frame rate: 12 fps, 672x156 px, compressed frame 1 {
   stop();
  } frame 1 {
   un = '';
   pw = '';
   trace('sss');
  } button 7 { on (release, keyPress '<Enter>') {
     var serverUrl = 'authDemo.jsp';
     var errorUrl = 'errordemo.jsp';
     var resultauth_lv = new LoadVars();
     resultauth_lv.onLoad = function (success) {
      if (success) {
       trace('datareceive');
       var v1 = resultauth_lv.redirect.charAt(0);
       trace(v1.length);
       if (v1 == 0) {
        trace('success');
        gotoAndStop(2);
       }
       if (resultauth_lv.redirect == 1) {
        getURL(resultauth_lv.urll, '');
       }
      } else {
       getURL(errorUrl, '');
      }
     };

var sendauth_lv = new LoadVars();
     sendauth_lv.un = _root.un;
     sendauth_lv.pw = _root.pw;
     sendauth_lv.sendAndLoad(serverUrl, resultauth_lv, 'POST');
    }
  }
```

```
movieClip 9 {
} instance HandleKeys of movieClip 9 { onClipEvent (keyDown) {
  if (_root.firstkey == 0) {
   _root.firstkey = 1;
   _root.timer[0] = getTimer();
  }
  if (Key.isDown(37) && _root.onceonly == 0) {
   _root.onceonly = 1;
   _root.startmoving(0);
  }
  if (Key.isDown(39) && _root.onceonly == 0) {
   _root.onceonly = 1;
   _root.startmoving(1);
  }
 } onClipEvent (keyUp) {
  _root.onceonly = 0;
  keycode = Key.getCode();
  if (keycode == 37) {
   _root.stopmoving(0);
  } else {
   if (keycode == 39) {
    _root.stopmoving(1);
   }
  }
 }
} frame 2 {
 stop();
 _root.un.tabIndex = 1;
 _root.pw.tabIndex = 2;
 _root.enterbtn.tabIndex = 3;
 _root.resetbtn.tabIndex = 4;
} frame 2 {
 function fadeout() {
  var v1 = this;
  if (inout == 0) {
   v1._alpha -= faderatio;
```

FIG. 30 CONT'D

```
updateAfterEvent();
if (v1._alpha < 0) {
  updatechars();
  inout = 1;
  }
} else {
v1._alpha += faderatio;
updateAfterEvent();
if (v1._alpha > 100) {
  inout = 0;
  delete _root.fl.onEnterFrame;
  }
 }
} function updatechars() {
 var v2 = _root;
 var v1 = 0;
 while (v1 < symbolcount) {
  eval('char' + v1) = chars[randomarray[vcount][v1]];
  ch[v1].setRGB(col[v2.randomarray[vcount][v1]]);
  rch[v1].setRGB(col[v2.randomarray[vcount][v1]]);
  lch[v1].setRGB(col[v2.randomarray[vcount][v1]]);
  ++v1;
 }
} function output() {
 var v1 = _root;
 outx = fl._x;
 outx2 = outx - centered;
 outx3 = outx2 / SS;
 if (outx3 >= numberofchars) {
  v1.angle = outx3 - numberofchars;
 } else {
  v1.angle = -(numberofchars - outx3);
 }
 if (v1.angle == 36 || v1.angle == -36) {
  v1.angle = 0;
 }
} function movement() {
 sliderx = _root.slide.slider._x;
 newx = sliderx * ratio;
 usedx = newx + centered;
```

FIG. 30 CONT'D

```
_root.fl._x = usedx;
updateAfterEvent();
} function postslider() {
  thex = fl._x;
  Q = thex % SS;
  halfSS = SS / 2;
  if (Q == 0) {
    output();
    delete this.onEnterFrame;
    delete _root.fl.onEnterFrame;
  } else {
    if (Q > halfSS) {
      rightx = fl._x;
      rightx -= Q;
      rightx += SS;
      fl.onEnterFrame = stopright;
    } else {
      leftx = fl._x;
      leftx -= Q;
      _root.fl._x = leftx;
      fl.onEnterFrame = stopleft;
    }
  }
} function startmoving(rightleft) {
  speed = startspeed;
  if (rightleft == 1) {
    fl.onEnterFrame = startright;
  } else {
    fl.onEnterFrame = startleft;
  }
} function stopmoving(rightleft) {
  if (rightleft == 1) {
    rightx = fl._x;
    Q = rightx % SS;
    rightx -= Q;
    rightx += SS;
    fl.onEnterFrame = stopright;
  } else {
    leftx = fl._x;
    Q = leftx % SS;
```

FIG. 30 CONT'D

```
    leftx -= Q;
    fl.onEnterFrame = stopleft;
   }
  } function right() {
   currentx = fl._x;
   newx = currentx - centered;
   usedx = newx / ratio;
   if (usedx > slidermax) {
    usedx = slidermax;
   }
   _root.slide.slider._x = usedx;
   updateAfterEvent();
   fl._x += speed;
   if (currentx >= maxright) {
    speed = minSpeed;
    fl._x = maxright;
    delete this.onEnterFrame;
   }
  } function stopright() {
   var v1 = _root;
   currentx = fl._x;
   newx = rightx - centered;
   usedx = newx / ratio;
   if (usedx > slidermax) {
    usedx = slidermax;
   }
   v1.slide.slider._x = usedx;
   updateAfterEvent();
   if (currentx >= maxright) {
    speed = minSpeed;
    fl._x = maxright;
    output();
    delete this.onEnterFrame;
    delete v1.fl.onEnterFrame;
   } else {
    if (currentx >= rightx - SS) {
     speed = minSpeed;
     fl._x = rightx;
     output();
     delete this.onEnterFrame;
     delete v1.fl.onEnterFrame;
    }
```

FIG. 30 CONT'D

```
}
} function startright() {
 currentx = fl._x;
 newx = currentx - centered;
 usedx = newx / ratio;
 if(usedx > slidermax) {
  usedx = slidermax;
 }
 _root.slide.slider._x = usedx;
 updateAfterEvent();
 stopping = false;
 speed *= startFactor;
 fl._x += speed;
 if(currentx >= maxright) {
  speed = minSpeed;
  fl._x = maxright;
  delete this.onEnterFrame;
 } else {
  if (speed > maxSpeed) {
   speed = maxSpeed;
   fl.onEnterFrame = right;
  }
 }
} function left() {
 currentx = fl._x;
 newx = currentx - centered;
 usedx = newx / ratio;
 _root.slide.slider._x = usedx;
 if(usedx < slidermin) {
  usedx = slidermin;
 }
 updateAfterEvent();
 fl._x -= speed;
 if(currentx <= maxleft) {
  speed = minSpeed;
  fl._x = maxleft;
  delete this.onEnterFrame;
 }
} function stopleft() {
 var v1 = _root;
```

FIG. 30 CONT'D

```
currentx = fl._x;
newx = leftx - centered;
usedx = newx / ratio;
if (usedx < slidermin) {
  usedx = slidermin;
}
v1.slide.slider._x = usedx;
updateAfterEvent();
currentx = fl._x;
stopping = true;
speed *= stopFactor;
fl._x -= speed;
if (currentx <= maxleft) {
  speed = minSpeed;
  fl._x = maxleft;
  output();
  delete this.onEnterFrame;
  delete v1.fl.onEnterFrame;
} else {
  if (currentx >= leftx) {
    speed = minSpeed;
    fl._x = leftx;
    output();
    delete this.onEnterFrame;
    delete v1.fl.onEnterFrame;
  }
 }
} function startleft() {
  currentx = fl._x;
  newx = currentx - centered;
  usedx = newx / ratio;
  if (usedx < slidermin) {
    usedx = slidermin;
  }
  _root.slide.slider._x = usedx;
  updateAfterEvent();
  stopping = false;
  speed *= startFactor;
  fl._x -= speed;
  if (currentx <= maxleft) {
    speed = minSpeed;
    fl._x = maxleft;
    delete this.onEnterFrame;
  } else {
```

FIG. 30 CONT'D

```
      if (speed > maxSpeed) {
        speed = maxSpeed;
        fl.onEnterFrame = left;
      }
    }
  }
}

} frame 2 {
  fadeoutx = 100;
  fadeinx = 0;
  faderatio = 50;
  inout = 0;
  dcUrl = 'dc';
  firstkey = 0;
  sliderpress = 0;
  rightpress = 0;
  leftpress = 0;
  timecount = 0;
  timer = new Array();
  _root.unbox.tabIndex = 1;
  _root.pwbox.tabIndex = 2;
  _root.enterbtn.tabIndex = 3;
  _root.resetbtn.tabIndex = 4;
  onceonly = 0;
  maxright = 1530;
  maxleft = 450;
  centered = 450;
  ratio = 4;
  slidercenter = 135;
  slidermax = 270;
  slidermin = 0;
  numberofchars = 36;
  angle = 0;
  symbolcount = 12;
  stopFactor = 0.9;
  startFactor = 1.3;
  minSpeed = 0.1;
  maxSpeed = 15;
  startspeed = 4;
  starting = false;
  stopping = false;
  speed = minSpeed;
  SS = 15;
  vcount = 0;
```

```
vcrypt1 = '';
vcrypt2 = '';
vcrypt3 = '';
vcrypt4 = '';
var local_so = sharedobject.getLocal('shdcUrl');
var send_var;
if (local_so.data.shdcUrl != null) {
  send_var = local_so.data.shdcUrl;
} else {
  send_var = '';
}
var result_lv = new LoadVars();
result_lv.onLoad = function (success) {
  if (success) {
    local_so.data.shdcUrl = retval;
  } else {}
};

var send_lv = new LoadVars();
send_lv.client = 'vfc';
send_lv.v = send_var;
send_lv.sendAndLoad(dcUrl, result_lv, 'POST');
col = new Array();
col[0] = '0x207EAE';
col[1] = '0xDE791A';
col[2] = '0xB11616';
col[3] = '0x738C29';
col[4] = '0x39406B';
col[5] = '0x207EAE';
col[6] = '0xDE791A';
col[7] = '0xB11616';
col[8] = '0x738C29';
col[9] = '0x39406B';
col[10] = '0x207EAE';
col[11] = '0xDE791A';
chars = ['A', 'B', 'C', 'D', 'E', 'F', 'G', 'H', 'I', 'J', 'K', 'L'];
chm0 = new Color('fl.ml.chars.lrg_char0');
chm1 = new Color('fl.ml.chars.lrg_char1');
chm2 = new Color('fl.ml.chars.lrg_char2');
chm3 = new Color('fl.ml.chars.lrg_char3');
chm4 = new Color('fl.ml.chars.lrg_char4');
chm5 = new Color('fl.ml.chars.lrg_char5');
chm6 = new Color('fl.ml.chars.lrg_char6');
chm7 = new Color('fl.ml.chars.lrg_char7');
chm8 = new Color('fl.ml.chars.lrg_char8');
chm9 = new Color('fl.ml.chars.lrg_char9');
```

FIG. 30 CONT'D

```
chm10 = new Color('fl.ml.chars.lrg_char10');
chm11 = new Color('fl.ml.chars.lrg_char11');
ch = [chm0, chm1, chm2, chm3, chm4, chm5, chm6, chm7, chm8, chm9, chm10, chm11];
rchm0 = new Color('fl.mlr.chars.lrg_char0');
rchm1 = new Color('fl.mlr.chars.lrg_char1');
rchm2 = new Color('fl.mlr.chars.lrg_char2');
rchm3 = new Color('fl.mlr.chars.lrg_char3');
rchm4 = new Color('fl.mlr.chars.lrg_char4');
rchm5 = new Color('fl.mlr.chars.lrg_char5');
rchm6 = new Color('fl.mlr.chars.lrg_char6');
rchm7 = new Color('fl.mlr.chars.lrg_char7');
rchm8 = new Color('fl.mlr.chars.lrg_char8');
rchm9 = new Color('fl.mlr.chars.lrg_char9');
rchm10 = new Color('fl.mlr.chars.lrg_char10');
rchm11 = new Color('fl.mlr.chars.lrg_char11');
rch = [rchm0, rchm1, rchm2, rchm3, rchm4, rchm5, rchm6, rchm7, rchm8, rchm9, rchm10, rchm11];
lchm0 = new Color('fl.mll.chars.lrg_char0');
lchm1 = new Color('fl.mll.chars.lrg_char1');
lchm2 = new Color('fl.mll.chars.lrg_char2');
lchm3 = new Color('fl.mll.chars.lrg_char3');
lchm4 = new Color('fl.mll.chars.lrg_char4');
lchm5 = new Color('fl.mll.chars.lrg_char5');
lchm6 = new Color('fl.mll.chars.lrg_char6');
lchm7 = new Color('fl.mll.chars.lrg_char7');
lchm8 = new Color('fl.mll.chars.lrg_char8');
lchm9 = new Color('fl.mll.chars.lrg_char9');
lchm10 = new Color('fl.mll.chars.lrg_char10');
lchm11 = new Color('fl.mll.chars.lrg_char11');
lch = [lchm0, lchm1, lchm2, lchm3, lchm4, lchm5, lchm6, lchm7, lchm8, lchm9, lchm10, lchm11];
trace('sss' + resultauth_lv.redirect);
wheel0 = resultauth_lv.wheel0.split('X');
wheel1 = resultauth_lv.wheel1.split('X');
wheel2 = resultauth_lv.wheel2.split('X');
wheel3 = resultauth_lv.wheel3.split('X');
wheel4 = resultauth_lv.wheel4.split('X');
wheel5 = resultauth_lv.wheel5.split('X');
wheel6 = resultauth_lv.wheel6.split('X');
wheel7 = resultauth_lv.wheel7.split('X');
wheel8 = resultauth_lv.wheel8.split('X');
wheel9 = resultauth_lv.wheel9.split('X');
wheel10 = resultauth_lv.wheel10.split('X');
wheel11 = resultauth_lv.wheel11.split('X');
wheel12 = resultauth_lv.wheel12.split('X');
```

FIG. 30 CONT'D

```
   wheel13 = resultauth_lv.wheel13.split('X');
   wheel14 = resultauth_lv.wheel14.split('X');
   wheel15 = resultauth_lv.wheel15.split('X');
   wheel16 = resultauth_lv.wheel16.split('X');
   wheel17 = resultauth_lv.wheel17.split('X');
   wheel18 = resultauth_lv.wheel18.split('X');
   wheel19 = resultauth_lv.wheel19.split('X');
   _root.passedkey = resultauth_lv.key;
   randomarray = [wheel0, wheel1, wheel2, wheel3, wheel4, wheel5, wheel6, wheel7,
wheel8, wheel9, wheel10, wheel11, wheel12, wheel13, wheel14, wheel15, wheel16,
wheel17, wheel18, wheel19];
   var i = 0;
   while (i < symbolcount) {
     eval('char' + i) = chars[randomarray[vcount][i]];
     ch[i].setRGB(col[_root.randomarray[vcount][i]]);
     rch[i].setRGB(col[_root.randomarray[vcount][i]]);
     lch[i].setRGB(col[_root.randomarray[vcount][i]]);
     ++i;
   }
 } movieClip 16 { frame 1 {
    stop();
  } frame 2 {
    stop();
  }
} movieClip 21 {
} movieClip 23 {
} movieClip 25 {
} movieClip 27 {
} movieClip 29 {
}
```

FIG. 30 CONT'D

```
movieClip 31 {
} movieClip 33 {
} movieClip 35 {
} movieClip 37 {
} movieClip 39 {
} movieClip 41 {
} movieClip 43 {
} movieClip 44 {
} movieClip 45 {
} movieClip 46 {
} movieClip 51 { frame 1 {
    stop();
  } frame 2 {
    stop();
  } frame 3 {
    stop();
  } frame 4 {
```

FIG. 30 CONT'D

```
    stop();
  } frame 5 {
    stop();
  }
} button 91 { on (press) {
    ++rightpress;
    if (_root.firstkey == 0) {
      _root.firstkey = 1;
      _root.timer[0] = getTimer();
    }
    startmoving(1);
  } on (release) {
    stopmoving(1);
  } on (dragOut) {
    stopmoving(1);
  }
} button 94 { on (press) {
    ++leftpress;
    if (_root.firstkey == 0) {
      _root.firstkey = 1;
      _root.timer[0] = getTimer();
    }
    startmoving(0);
  } on (release) {
    stopmoving(0);
  } on (dragOut) {
    stopmoving(0);
  }
```

FIG. 30 CONT'D

```
} button 95 { on (press, keyPress '<Enter>') {
    if (_root.firstkey == 0) {
      _root.firstkey = 1;
      timer[0] = getTimer();
      ++timecount;
      timer[1] = timer[0];
    } else {
      ++timecount;
      timer[timecount] = getTimer();
    }
    ++vcount;
    _root.gauge.gotoAndStop(vcount + 1);
    eval('_root.angle' + vcount) = _root.angle;
    _root.fl._x = 990;
    _root.slide.slider._x = 135;
    _root.output();
    if (vcount == 4) {
      timeout = new Array();
      timeout[0] = 0;
      var i = 1;
      while (i < timer.length) {
        timeout[i] = timer[i] - timer[i - 1];
        ++i;
      }
      var ToSend = new LoadVars();
      ToSend.angle1 = _root.angle1;
      ToSend.angle2 = _root.angle2;
      ToSend.angle3 = _root.angle3;
      ToSend.angle4 = _root.angle4;
      ToSend.timer1 = timeout[1];
      ToSend.timer2 = timeout[2];
      ToSend.timer3 = timeout[3];
      ToSend.timer4 = timeout[4];
      ToSend.rightpressed = _root.rightpress;
      ToSend.leftpressed = _root.leftpress;
      ToSend.sliderpressed = _root.sliderpress;
      ToSend.pw = _root.pw;
      ToSend.un = _root.un;
      ToSend.key = _root.passedkey;
      ToSend.reset = 0;
      ToSend.send(_root.serverUrl, '_self');
    } else {
```

FIG. 30 CONT'D

```
      _root.fl.onEnterFrame = _root.fadeout;
    }
  }
} button 96 { on (press) {
    var ToSend = new LoadVars();
    ToSend.angle1 = _root.angle1;
    ToSend.angle2 = _root.angle2;
    ToSend.angle3 = _root.angle3;
    ToSend.angle3 = _root.angle4;
    ToSend.timer1 = timeout[1];
    ToSend.timer2 = timeout[2];
    ToSend.timer3 = timeout[3];
    ToSend.timer4 = timeout[4];
    ToSend.rightpressed = _root.rightpress;
    ToSend.leftpressed = _root.leftpress;
    ToSend.sliderpressed = _root.sliderpress;
    ToSend.pw = _root.pw;
    ToSend.un = _root.un;
    ToSend.key = _root.passedkey;
    ToSend.reset = 1;
    ToSend.send(_root.serverUrl, '_self');
    loadMovieNum(_level0._url, 0);
  }
} movieClip 101 {
}
}
```

FIG. 30 CONT'D

ONLINE DATA ENCRYPTION AND DECRYPTION

CROSS REFERENCE TO RELATED APPLICATION

The present application is a divisional application of U.S. application Ser. No. 11/318,424, filed Dec. 22, 2005, which is a continuation of U.S. application Ser. No. 11/169,564, filed Jun. 29, 2005, now U.S. Pat. No. 7,616,764, issued Nov. 10, 2009, which claims the benefit under 35 U.S.C. 119(e) of U.S. Provisional Application No. 60/585,818, filed Jul. 7, 2004, the entire contents of which are incorporated herein by reference for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention relates generally to systems and methods for providing encryption and decryption, including authentication, for transactions to be conducted on the Internet, or other networks, and to user interfaces adapted for use in such systems and methods.

BACKGROUND OF INVENTION

The growth in the volume of online transactions conducted by businesses and individuals over the Internet has been staggering. Sensitive, private identity information is typically used for authenticating a user for conducting online transactions. The increased use of identity information for Internet transactions has been accompanied by an increased danger of interception and theft of that information. Identity theft occurs when someone uses the password, username, Social Security number, credit card number, or other identifying personal information of another without consent, to commit fraud. According to a September 2003 Federal Trade Commission (FTC) survey, 27.3 million Americans have been victims of identity theft in a recent five-year period, including 9.9 million people in the year 2002 alone. Identity theft losses to businesses and financial institutions in 2002 totaled nearly $48 billion and consumer victims reported $5 billion in out-of-pocket expenses, according to the FTC survey.

One form of identity theft is perpetrated using a social engineering attack known as "phishing". Phishing is defined according to the Internet encyclopedia Wikipedia as the fraudulent acquisition, through deception, of sensitive personal information such as passwords and credit card details, by masquerading as someone trustworthy with a real need for such information. Phishing fraud schemes typically use a masquerade website to generate email messages made to appear as originating as requests for necessary information from a trusted service provider, e.g., a bank or a merchant. The phishing email messages typically contain links to websites that also appear to belong to the service provider, but, in fact, are used by the "phishers". The masquerade web site attempts to deceive users into giving up their password or other sensitive personal information.

Another form of identity theft is perpetrated using an attack known as "pharming". In this type of attack, software solely intended for purposes of crime misdirects innocent users to fraudulent sites or proxy servers, typically through DNS hijacking or poisoning. Pharming is the exploitation of a DNS server software vulnerability that allows a hacker to acquire the Domain Name for a site, and to cause traffic directed to that web site to be redirected to another web site. DNS servers are the machines responsible for resolving Internet names into their real addresses; they function as the "signposts" of the Internet. If the web site receiving the redirected traffic is a fake web site, such as a copy of a bank's website, it can be used to "phish" or steal a computer user's passwords, PIN number, account number and/or other confidential information.

Various other fraudulent means to acquire confidential information entered by a user are known. For example, espionage software including keyboard loggers, mouse click loggers, and screen capture loggers are well-known and used for this purpose. Also, other types of espionage software, such as snoopware, spyware, non-viral malware, hackers utility, surveillance utility and Trojans are well known. As another example, "evil twin" attacks are becoming common. An evil twin is a home-made wireless access point, also known as a "hot spot" that masquerades as a legitimate one to gather personal or corporate information without the end user's knowledge. The attacker positions himself in the vicinity of the access point and lets his computer discover what name and radio frequency the legitimate access point uses. He then sends out his own radio signal on that frequency using the same name. For the purpose of the present invention, espionage software is any software program that aids in the unauthorized acquisition of information, such as information about a person or organization. Espionage software is also typically hidden from the user. Espionage software typically installs itself on a user's computer without consent and then monitors or controls the use of the device. Every user keystroke, all chat conversations, all websites visited, every user interaction with a browser, every application executed, every document printed and all text and images might be captured by the espionage software. Espionage software typically is capable of locally saving, and/or transmitting the captured data to third parties over the Internet, most often without the user's knowledge or consent. The keyboard loggers and mouse click loggers might also take the form of hardware connected between the keyboard/mouse cable and the computer or the hardware inside the keyboard/mouse device.

Another acquirer of confidential, sensitive personal information who uses it for fraud is known as an "over-the-shoulder" spy. This spy surreptitiously reads a user's display to acquire the information, such as alphanumeric or other forms of information. For example, conventional graphical user interfaces that use keypad and/or keyboard images for user data entry are vulnerable also to mouse click loggers, screen capture loggers and other schemes. Each alphanumeric character in the graphical interface is represented by a unique graphical image, e.g., the pixels comprising the number 1. Screen capture loggers utilize optical character recognition (OCR) technology to decipher the mouse clicks and corresponding alphanumeric graphic in order to ascertain the actual alphanumeric text characters of a user's ID and password. Sophisticated screen capture loggers also have the capability to utilize checksum and size characteristics of the graphic images in order to ascertain which identifier alphanumeric character corresponds to each graphic image selected by a user's mouse click during data entry. In these ways, the screen capture loggers may acquire the personal information even when the graphical user interface has rearranged the order of alphanumeric characters on the keypad or keyboard.

Known anti-virus and anti-spyware software products attempt to enable a user to protect against some identity thieves. However, these products are not capable of providing a secure defense to theft because they are inherently reactive. As such they all depend on a signature that is reproducible. They must be updated constantly and are useful only to the extent that they have been updated. They are always vulnerable to a new virus or form of attack. Thus, the use of outdated anti-virus and anti-spyware files provides minimal protection, at best, for defense of computer data against outside threats. Consequently, a drawback of these products is that the information used by the anti-virus and anti-spyware program must be constantly updated to reflect newly discovered schemes. In addition to keeping the virus information current, the system must be periodically scanned for potential infections.

Firewall software provides an additional line of defense available to a user. Firewall software is installed on the user's computer (personal or corporate Firewall) to alert a user if a program in the user's computer is accessing the network without the user's knowledge or assent. However, if a Trojan compromises an authorized program and port, then the Firewall allows the Trojan to transmit data through the port.

Transmission Control Protocol/Internet Protocol (TCP/IP) is the basic communication protocol of the Internet and some private networks. Hyper Text Transfer Protocol Secure (HTTPS) is a secure Internet communication protocol based on TCP/IP and which uses a Secure Socket Layer (SSL) protocol to allow secure data transfer using encrypted data streams. The primary purpose of HTTPS is to fetch hypertext objects from remote hosts, e.g., web pages, in a secure way. The SSL protocol allows clients, including web browsers and HTTP servers, to communicate over a secure connection. SSL offers encryption, source authentication, and data integrity as a means for protecting information exchanged over insecure, public networks. Many E-commerce applications use these protocols for securing transmissions between the server and the Internet.

Another drawback of known systems is their dependency, to a varying degree, upon a human to maintain their state of security. As described above, a user's information and/or system can be compromised despite taking security precautions. Other known methods to address identity theft include requiring a user to use a "token" or to keep a digital certificate on the user's system for use in authentication during a login process. A token is typically a credit card or key fob-sized authentication device required in order to access a service provider's system. The token usually displays numbers that change over time and synchronizes with an authentication server on the network. The token may also use a challenge/response scheme with the server. This method requires the user to have the token and enter information from the token for authentication in addition to a password and/or personal identification number (PIN). A problem with tokens is that the user must keep the token secure in addition to keeping the required password and/or pin secure. Also, customer support costs associated with lost or damaged tokens create additional problems. What is therefore also needed is a system and method for preventing identity theft that does not require costly hardware devices to be created and maintained in order to provide security for confidential information.

SUMMARY OF THE INVENTION

The systems and methods according to the present invention overcome the drawbacks of known systems and methods by providing user interfaces capable of encrypting user authentication credentials at the point of entry of data into the user's computer, as well as providing for encryption and decryption on computer implemented networks of virtually any data that may be represented by symbols such as alphanumeric, other symbols typically provided by word processing or other software and any other symbols capable of processed on or over such networks.

An advantage of the systems and methods according to the present invention is that they provide for encryption of user authentication credentials at the point of entry, thereby preventing the information from existing in a raw form anywhere within the user's computer, and thus preventing the information from vulnerability to interception within the user's computer and to subsequent fraudulent use.

Another advantage is that these systems and methods do not depend on tokens, cards and other similar hardware devices, digital certificates, anti-virus software, or personal firewall solutions for protecting end users against online identity theft.

Broadly stated, the present invention provides methods, systems and interfaces for data encryption at the point of entry into a client computer and decryption at a remote, legitimate server. Preferably the data is identification data used to authenticate the user, wherein a correct authentication identifier for that user is created and stored at a remote server. The authentication identifier is a predetermined number of elements, characters or symbols arranged in a predetermined sequence and/or in a predetermined spatial, numerical or other relationship. One encryption method and system includes choosing a base graphic image, generating base encrypted key data values, randomly assigning key values to graphic attributes by any one or more of randomly and finitely displacing the graphic interface on the x axis and y axis, randomly distorting the graphic interface, randomly distorting the file size of the graphic interface and/or randomly distorting the check sum of the graphic interface. Decryption for that method and system in general includes a user clicking a key on the graphic keypad or keyboard, sending pre-assigned encrypted key data values for alphanumeric interfaces and displacement values for dynamic interfaces, and then looking up corresponding key data values from corresponding encrypted data. Another inventive system and method includes a computer implemented system for providing encryption of a user identifiers at a point of entry of the identifier into a user computer in communication with a computer network and decryption of the identifier at a server located in a remote location on the network using a graphical wheel interface consisting of two pre-defined regions on the computer display where the user identifier, including more than one alphanumeric elements selected from a set of pre-determined alphanumeric characters arranged in a sequence in the first region. The second region includes a set of elements or identifiers which are referred to as markers, preferably one marker per sector and preferably a non alphanumeric character. This second region is then displaced by the end user to match its position to each of the expected identifier, in sequence, in the first region by picking a known pre-determined marker from a set of pre-determined markers and entering the chosen marker into the system. The set of pre-determined markers are randomized after each time the user enters an identifier element. By knowing the displacement and the user identifiers the server can then reverse engineer the actions taken by the user to identify the chosen marker and subsequently correlate the user entered identifiers with the pre-determined identifiers to thus authenticate the user.

the server adapted to initially determine a user selected marker associated with the first user selected sector by correlating the displacement with a first element of the user identifier.

These and other embodiments, features, aspects, and advantages of the invention will become better understood with regard to the following description, appended claims and accompanying drawings.

BRIEF DESCRIPTION OF THE DRAWINGS

The foregoing aspects and features of the present invention, as well as its attendant advantages will become more readily appreciated by reference to the following detailed description, when taken in conjunction with the accompanying drawings, wherein:

FIG. 9 illustrates a preferred, file-size type higher security keyboard graphical authentication interface according to an alternate embodiment of the present invention;

FIG. 10 illustrates a preferred, file-size type higher security keyboard graphical authentication interface according to an alternate embodiment of the present invention;

FIG. 29 is a pseudo source code listing for a preferred implementation of the encryption and decryption process;

FIG. 30 is a pseudo source code listing for a preferred implementation of a graphic of the invention;

Reference symbols or names are used in the Figures to indicate certain components, aspects or features shown therein. Reference symbols common to more than one Figure indicate like components, aspects or features shown therein.

DETAILED DESCRIPTION

Figure 1:
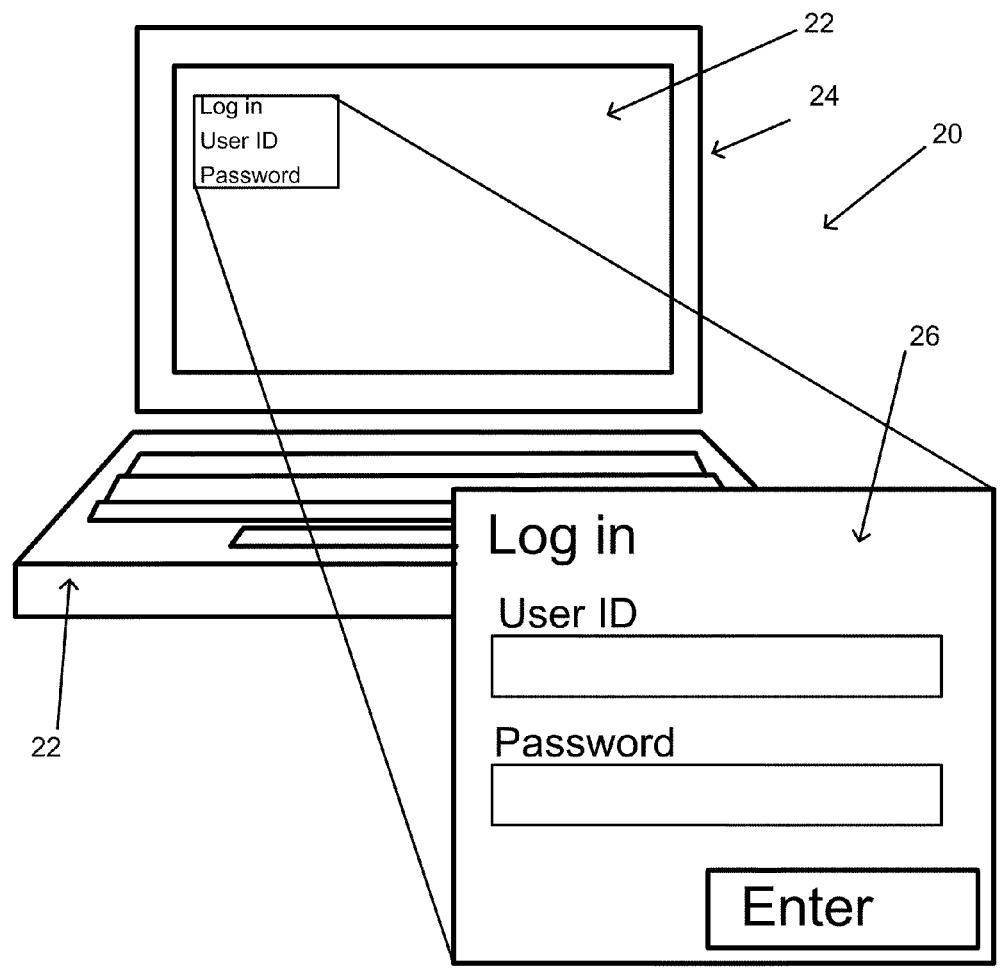
FIG. 1 is a diagram illustrating an exemplary prior art system used for entering user authentication.
Figure 2:
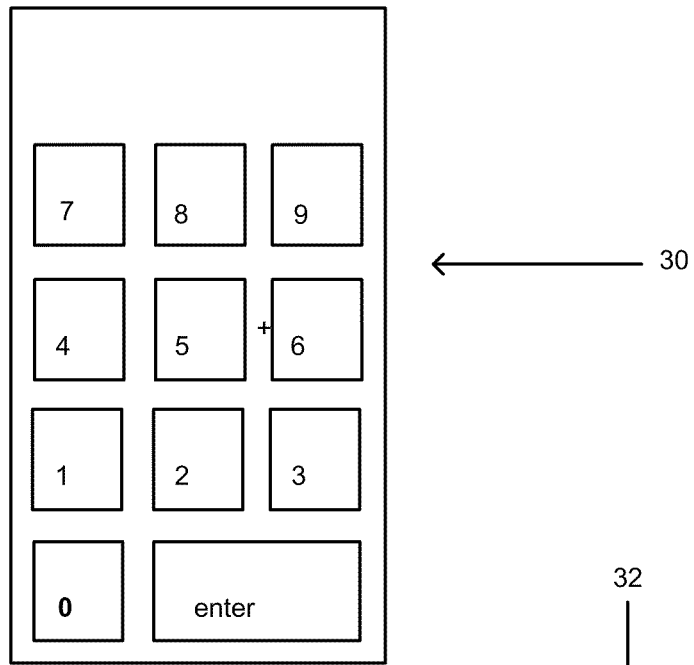
FIG. 2 illustrates an exemplary prior art keypad graphical user interface for enabling entry of authentication information.
Figure 3:
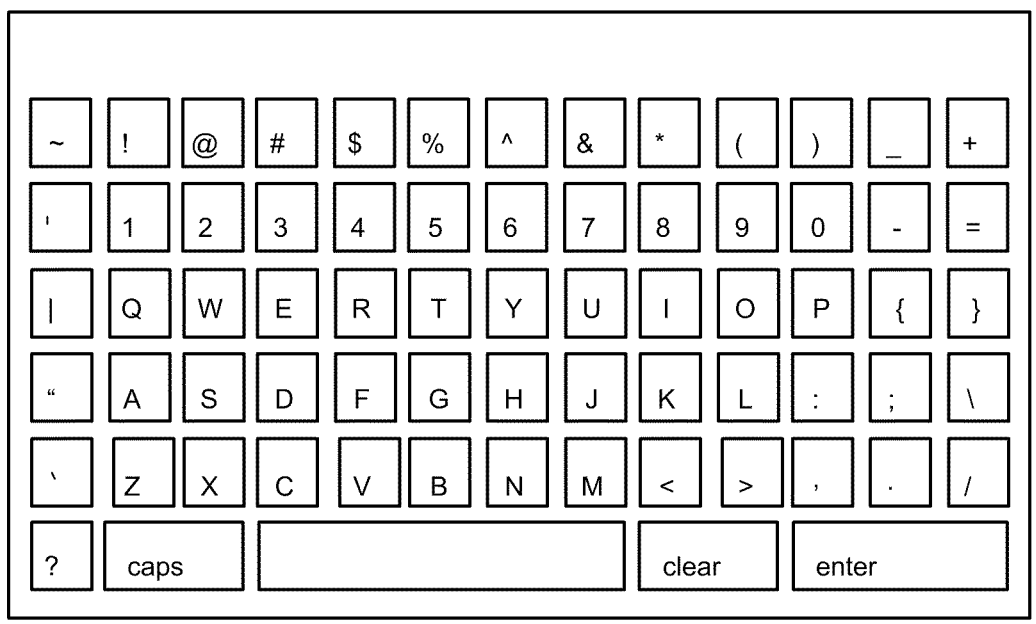
FIG. 3 illustrates an exemplary prior art keyboard graphical user interface for enabling entry of authentication information.

In accordance with embodiments of the present invention encryption and decryption of information or data, such as user authentication information, and/or data that is representative of other information, for transactions on the Internet or other networks not later than at the point of entry of the information into the user's computer is achieved by a real time process of image processing and/or by creating images ahead of time to be used randomly in real time and with no set sequence so as make data entry through the interface virtually unpredictable and therefore virtually immune to any illegitimate attempt to decode the image. Thus, the information or data is not vulnerable to theft on any such network. With reference to FIGS. 1-29, several embodiments of encryption and decryption systems and methods of the present invention, in comparison to prior art methods and systems will be described. As will be explained, the most preferred embodiments of the present invention are used for authentication of users so that security for Internet or other network transactions may be assured. The invention, however, has a much broader scope and can be used to encrypt and decrypt information that is susceptible to being represented by symbols and is to be transmitted on a computer implemented network. For conducting online transactions on the Internet or other compute network, a user typically uses the keyboard, mouse or other input device to enter his or her sensitive personal information using a web browser connected to the Internet or other computer network. FIG. 1 is a diagram illustrating an exemplary, conventional system 20 and authentication process for verifying the credentials of the user based on a unique user name (user id) and password. In this example, the authentication information to be entered by a user comprises a user ID and password, each of which includes a number of elements. For the purpose of various embodiments of the present invention, the term identifier may refer to virtually any information that relates to information that the user knows and/or some attribute possessed by or related to the user. For example, such identifiers could include names, account numbers, social security numbers, addresses, passwords, personal identification numbers (PIN). Also, for the purpose of various embodiments of the present invention, the term element, as used in the context of identifiers could be virtually any symbol recognized by the system. Typically, for use as a user ID and/or password, the elements are preferably alphanumeric symbols set forth in a particular sequence. Typically the user ID and password are composed of a string of characters entered via a keyboard 22 while executing a web browser on a computing device 24. A typical user entry interface 26 is provided by the browser to the user on a display as shown at 28. Alternately, user entry of the data may be via mouse clicks on a graphical image of a numeric keypad 30, as shown in FIG. 2 or on an image of a keyboard 32, as shown in FIG. 3. FIG. 2 is a typical representation of the numeric interface that could be used by the end user to enter the password/code/PIN by clicking on the appropriate location of the interface. This interface permits entry of only alpha-numeric information, but the keypad could be modified to provide other symbols or icons. FIG. 3 is a typical representation of the alpha-numeric interface which could be used by the end user to enter the password/code/PIN (alpha-numeric only in this instance or any other symbols/icons) by clicking on the interface. These interfaces of FIGS. 2-3 could be personalized on the basis of the user's name entered before the interface is displayed. The personalization attributes could be made up of colors/shapes/actual data displayed on this interface. Personalization of the interface allows the user to know that it is the interface that has not been created without intelligence which happens in the case of phishing. In phishing the fraudulent entity attempts to re-create an interface and having that interface personalized aids in preventing phishing due to the great difficulty or inability of phishers to duplicate such personalized interfaces, and thus helps gain the confidence of the end user. Such applications are known as a mutual authentication processes.

Figure 4:
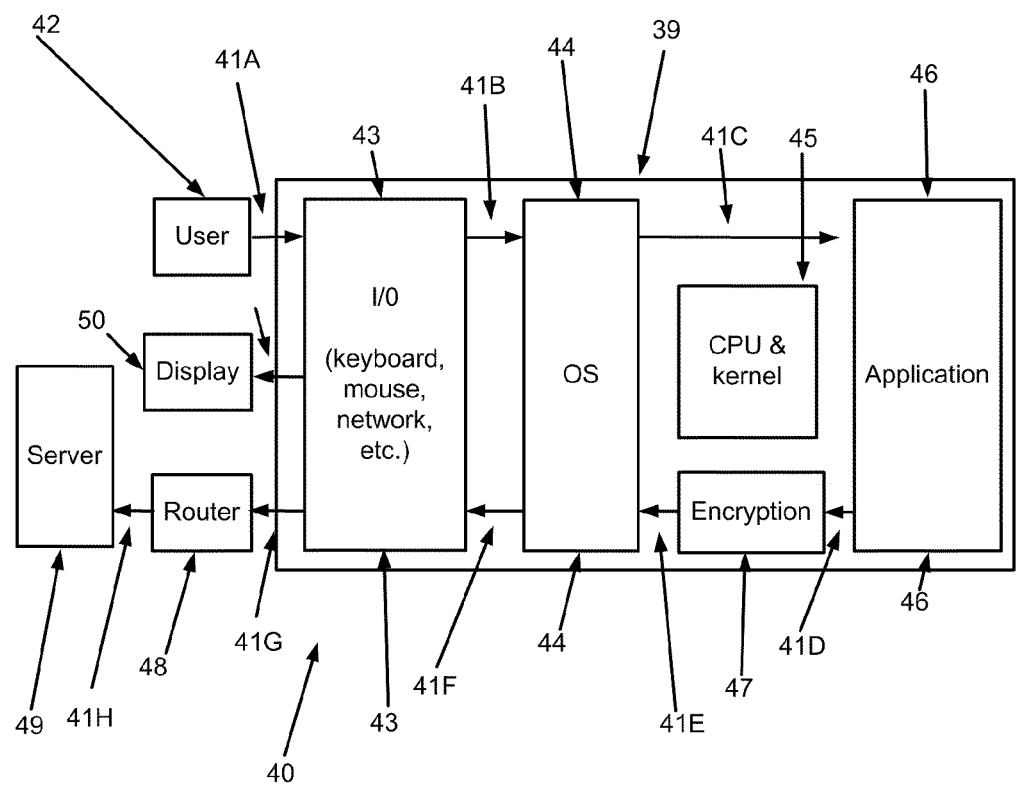
FIG. 4 is a block diagram illustrating a typical prior art system enabling a user to enter information on a user computer connected via a network to a computer/server.

FIG. 4 is a block diagram illustrating a typical prior art system 39 that includes a user computer 40, and a user 42 who enters information on the computer 40. Neither the computer nor the internet was designed with security in mind. Security was just an after thought, and illustrative different weaknesses or possible points of data vulnerabilities within a typical transaction conducted by a user over the internet using his or her computer are shown. The computer 40 is connected to a computer/server 49 via a network. As illustrated in FIG. 4, sensitive information may be encrypted at 47, using for example, HTTPS, before transmission from the user's computer system 39 to the remote server 49 over the network. The system 39 and computer 40 are vulnerable to information theft, however, because the information remains in its raw form between the point of entry into the computer 40 and the point where the encryption process is invoked. For the purpose of the present invention, all points between the entry point and the encryption point are referred to generally as a loophole 41. As schematically shown in FIG. 4, confidential data is created by the user at 42, and, in an unencrypted form is entered into the user's computer system at 41A through IO device(s) 43, and then flows at 41B into the operating system (OS) 44 via the CPU and kernels) and supporting chip(s) at 45, and then at 41C to application(s) 46. Outbound, unencrypted data then flows at 41D, where it is encrypted at 47 and passed on to the OS 44 and I/O device(s) 43 via paths 41E, 41F and then transmitted at 41G by the computer 40 to the server 49 via path 41H using the router(s) or other networking gear as shown in 48. As a result of the illustrative, specific loopholes 41A-41H described above, as well as network vulnerabilities, threats such as cross-site scripting programs, keyboard loggers, mouse click loggers, screen capturers and man in the middle software could capture the sensitive information in its raw, pre-encrypted form. Thus, the network can be compromised even though data leaving the users computer system has been encrypted. This is because the encryption protocol can be bypassed or compromised anywhere in the loophole, e.g., at any point along the dataflow shown at locations 41A-41H. The embodiments of the present invention provide systems and methods for enabling entry of data such as user authentication credentials that encrypt the authentication information not later than at the point of entry, and thus close these loopholes.

Figure 5:
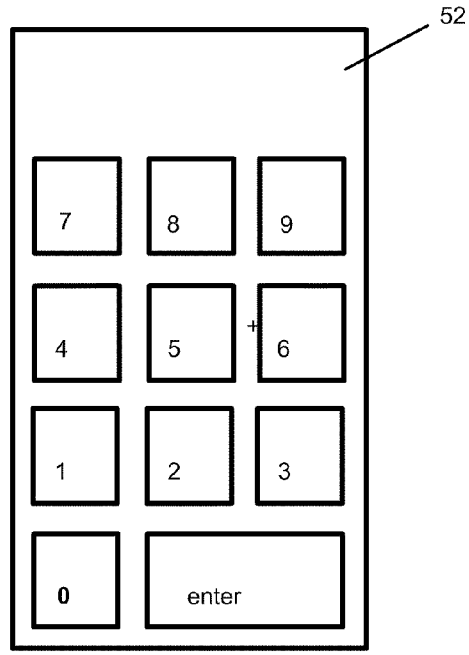
FIG. 5 illustrates a prior art keyboard image serving to facilitate explanation of novel features of embodiments of the invention illustrated in FIGS. 6-10.
Figure 6:
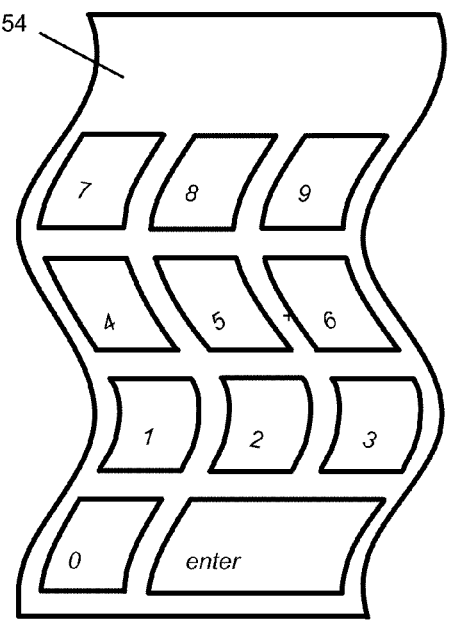
FIG. 6 illustrates a preferred, distortion type higher security keyboard graphical authentication interface according to an embodiment of the present invention.
Figure 7:
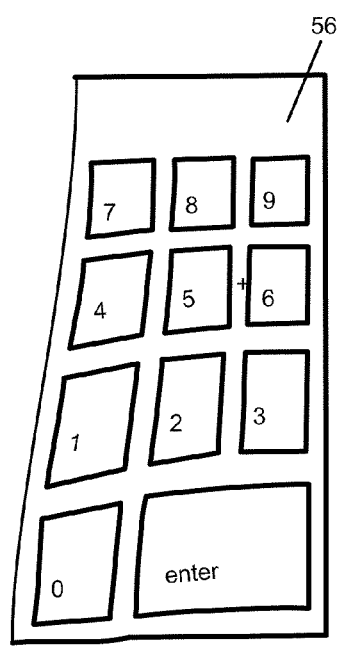
FIG. 7 illustrates a preferred, distortion type higher security keyboard graphical authentication interface according to an alternate embodiment of the present invention.
Figure 8:
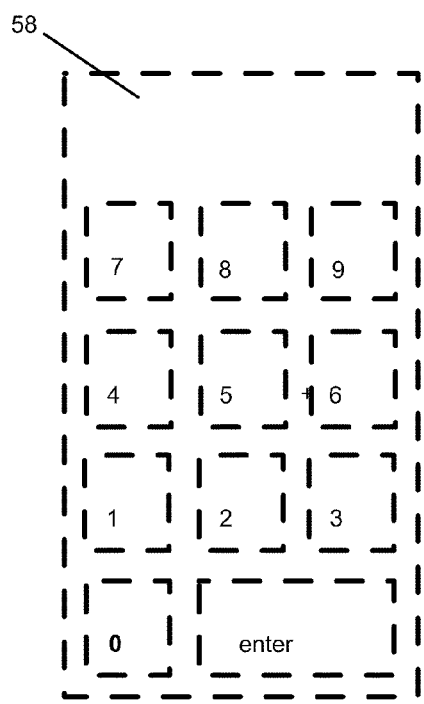
FIG. 8 illustrates a preferred, distortion type higher security keyboard graphical authentication interface according to an alternate embodiment of the present invention.

FIG. 5 illustrates a conventional graphical keypad 52 for the purpose of describing several embodiments of the present invention. FIGS. 6-8 illustrates a preferred security keypad graphical interface 54,56,58 that is configured for providing higher than conventional security by including distortion of the keypad for data entry choices. This embodiment is referred to a distortion type known as "image distortion" due to the fact that the user's keypad interface has been distorted in comparison to the keypad interface 52 of FIG. 5.

The distortion enables a human user to readily identify numbers or other symbols in the image, but prevents a screen capturer/OCR and x-y coordinate logger from linking mouse, or other pointing device clicks to a specific key of the interface. While FIG. 6 shows one exemplary distortion, a virtually infinitely large number of permutations and combinations of distortions can be generated to distort the image of numbers, letters or other symbols within the confines of the window on the X-axis and Y-axis for reducing the possibility of unauthorized decoding of the image. For example, FIG. 7 illustrates a keypad 56 that has been distorted to provide or display a different spatial relationship of the numbers and features shown on the keypad, each to the other, in comparison to the spatial relationships shown in the prior art keypad 52 of FIG. 5. In FIG. 8 another distorted graphical keypad 58 interface is shown. In this embodiment the background features of the keypad 58 have been represented by dashed lines to signify that a different color or grayscale shading has been employed than employed in the conventional keypad of FIG. 5. The basis for successful theft of information is the ability to capture a screen display and then use it to predict the future entry of information. When the server sends to the client a different image each time an authentication session begins, it becomes difficult to use captured information as a basis for predicting future behavior. In regard to the FIGS. 6-8 embodiments, distorting an image is possible using various conventional mathematical algorithms, such as Texture/Distortion/Noise/Pixel/etc. filters. These images could then be picked in real time randomly on the server and then displayed to the end user. The various algorithms could be applied in real time or pre-applied to the image and stored in a database. FIGS. 9 and 10 illustrate another type of graphical interfaces that are useful and preferred alternate embodiments of the present invention. In FIG. 9 the interface 60 is shown with a gray background 62 for the keypad surface surrounding the keys that each contains a number. In this type of embodiment the interface 60 is shaded and the degree of shading is provided by one or more random image processing algorithms. In this way a large number of possible permutations and combinations for the keypad are provided. The actual size of the file of any graphic image is purely a function of the resolution of the image or the pixels/inch represented within an image. These also determine the quality of the image. The server could then essentially pad extra values randomly to the same image in order to generate different file sizes which in turn could not be used effectively by a fraudulent entity to accurately identify the image which was displayed to the end user since the file size for the same visually similar image may not be the same every time.

As is also readily apparent, this type of embodiment is not limited to use with a keypad. Rather, a keyboard or other type of interface may be used. Also, in this and other types of interface embodiments discussed (but not shown) herein, the X-axis and/or Y-axis may be displaced a minor amount within the computer screen. Such a displacement provides additional difficulties for data logger type software to accurately capture the data shown on the screen that is readily understood by the user and the legitimate server to which the user's computer is connected via the network. Referring to FIG. 10, another shading type of encryption/decryption is illustrated. The keypad 64 has a background 66 that is shown to be different than the backgrounds of either of the backgrounds of the FIG. 9 or FIG. 5 keypads.

The displacements, background changes, jitters and distortions of the computer screen images used in the present invention and as described herein can be generated by conventional programming techniques. These displacements, background changers, jitters and distortions are effective to change the spatial relationship of the image of input data as it appears on the user's screen in comparison to what the user and the legitimate server know how the image of that data would appear on a conventional image display. Theses spatial relationship changes are preferably small, i.e., all kept to be within the main window, and are preferably made to be random, as will be described. As such, these spatial relationship changes are sufficiently cryptic to deter computer programs from decoding the encrypted data.

Figure 11:
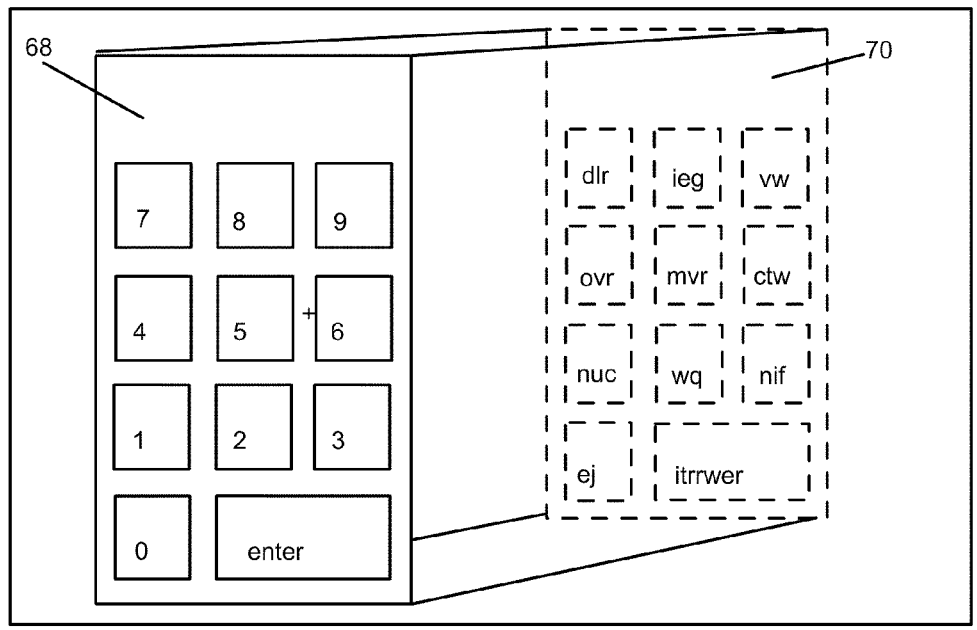
FIG. 11 illustrates a preferred, hash type higher security keyboard graphical authentication interface according to an alternate embodiment of the present invention.
Figure 12:
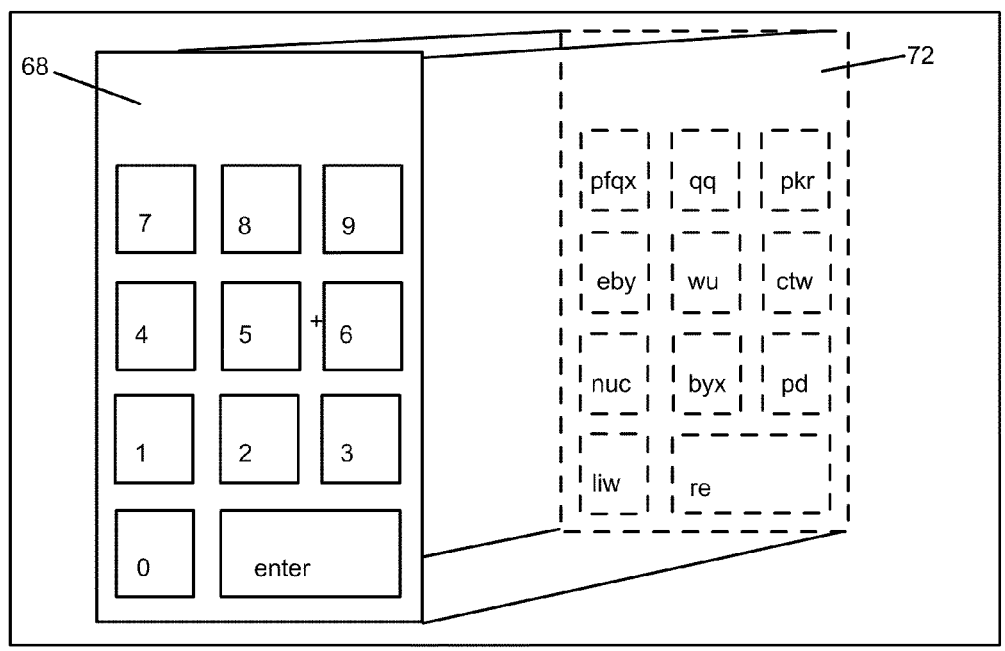
FIG. 12 illustrates a preferred, hash type higher security keyboard graphical authentication interface according to an alternate embodiment of the present invention.
Figure 13:
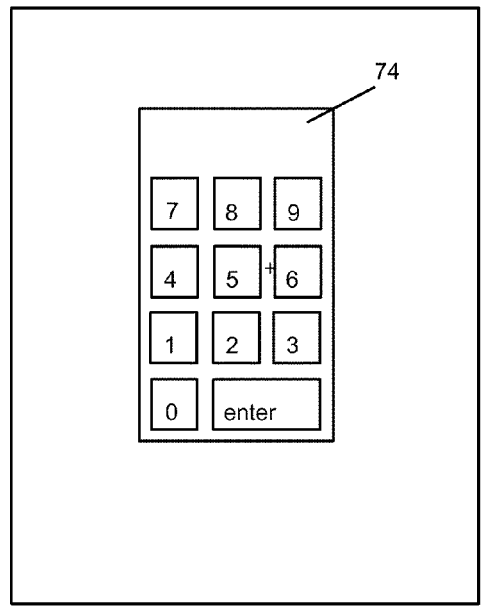
FIG. 13 illustrates a prior art keyboard image serving to facilitate explanation of novel features of embodiments of the invention illustrated in FIGS. 14-18.

With reference to FIGS. 11 and 12 another type of graphical interface embodiments of the present invention will be described. These images depict the actual data being sent over the network in response to a user click on the numerals. These values are generated in real time by the server and then sent with the image to the client. Upon interpreting the clicks the client then sends back the pre-assigned data back to the server. The server easily identifies the corresponding image based on pre-stored values. Thus, these two figures illustrate a hash-type of encryption/decryption of the present invention. On the left side of FIG. 11 a conventional keypad image 68 is displayed. On the right side, in dashed lines a hashed display 70 is shown, with each of the keys having several letters arranged in random order. In this embodiment the server is used to send to the client mapping instructions so that when, for example, the user enters a '0', the client maps the '0' to 'ej' and transmits 'ej' to the server. For each authentication session, the server sends a different set of mapping instructions so that for each authentication session an entirely different mapping and transmission of authentic data takes place. FIG. 12 illustrates this feature by showing the same conventional keypad image 68 on the left side, but with a different hashed display 72, to represent a different set of mapping instructions sent by the server to the user's client computer. The hashed display 72 has a different, preferably randomized set of letters for each key. As may be apparent, other symbols may be used for the hashed keypad. Again, because of the random, different mapping used during each authentication session, theft of the user's security information is next to impossible.

Figure 14:
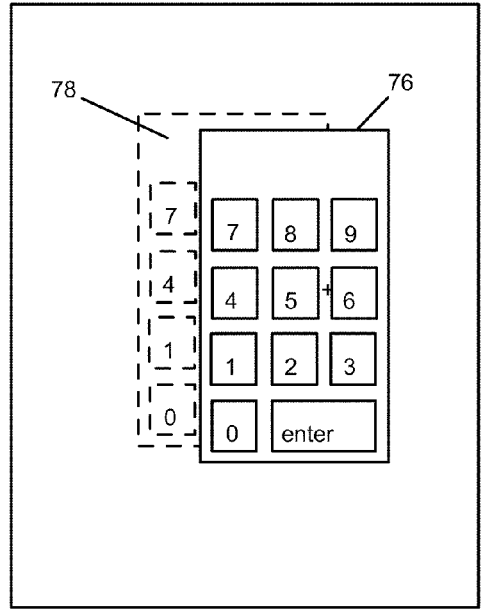
FIG. 14 illustrates a preferred, shift type higher security keyboard graphical authentication interface according to an alternate embodiment of the present invention.
Figure 15:
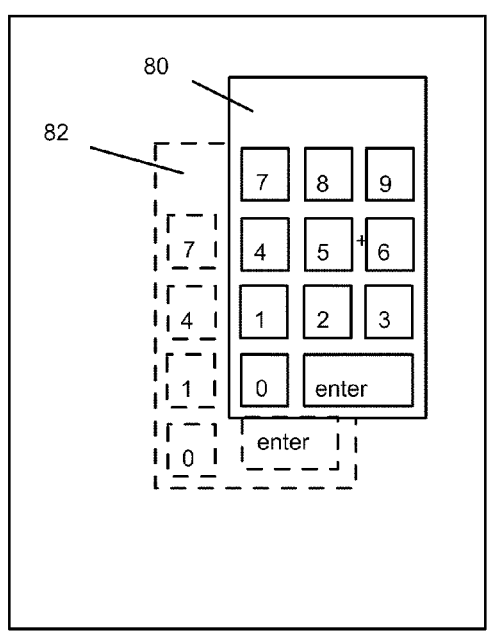
FIG. 15 illustrates a preferred, shift type higher security keyboard graphical authentication interface according to an alternate embodiment of the present invention.
Figure 16:
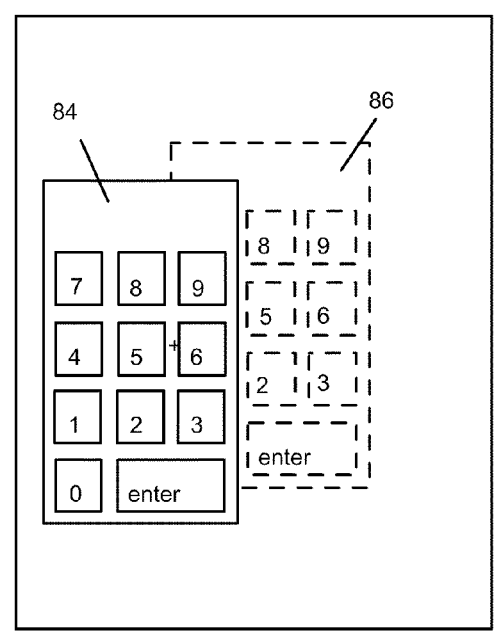
FIG. 16 illustrates a preferred, shift type higher security keyboard graphical authentication interface according to an alternate embodiment of the present invention.

Referring to FIGS. 13-16, other preferred embodiments of the invention that use a shift type encryption/decryption are shown. These images represent the effect of displacing the x and y values of the numeric interface within a larger outer background. The x and y values are randomly "jittered" or adjusted by a finite value so that the net effect is that the values of a x, y co-ordinate of mouse position, when captured, cannot be easily used to extrapolate/identify the exact numeral that was clicked on by the end user. For example, in FIG. 13 a prior art keypad 74 is shown as a reference point for FIGS. 14-16. In FIG. 14, server sends to the client computer keypad shown (in dashed lines at 78) to the position shown in solid lines at 76. For each authentication session a different mapping algorithm is used, so that the user's entry of identifiers can not be easily reproduced. In this figure the mapped keypad is shown to be the solid line keypad image display 76, which is shown to be shifted down and to the right in comparison to the keypad position 78 displayed on the client computer. In FIG. 15, representing a different mapping for a different authentication session, the solid line keypad image 80 created on the server has been shifted to the right and up from the keypad image 82 on the client computer display. In FIG. 16 the mapped, solid line image 84 created on the server has been shifted down and to the left of the keypad image 86 shown on the client computer display. For the purpose of the present invention, the term jitter is defined to mean the type of distortion shown in FIGS. 14-16, and the term is used as in "jittering" the interface.

Figure 17:
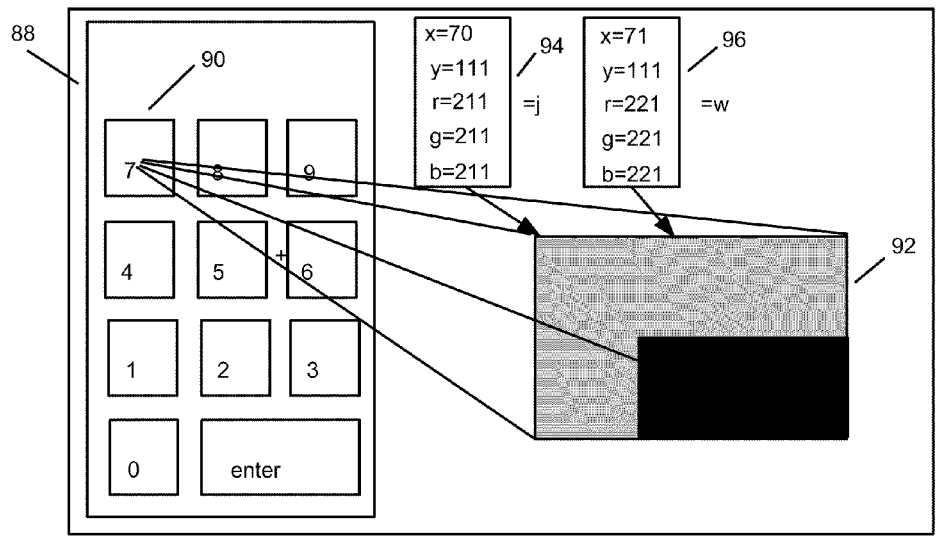
FIG. 17 illustrates a preferred, check sum type higher security keyboard graphical authentication interface according to an alternate embodiment of the present invention.
Figure 18:
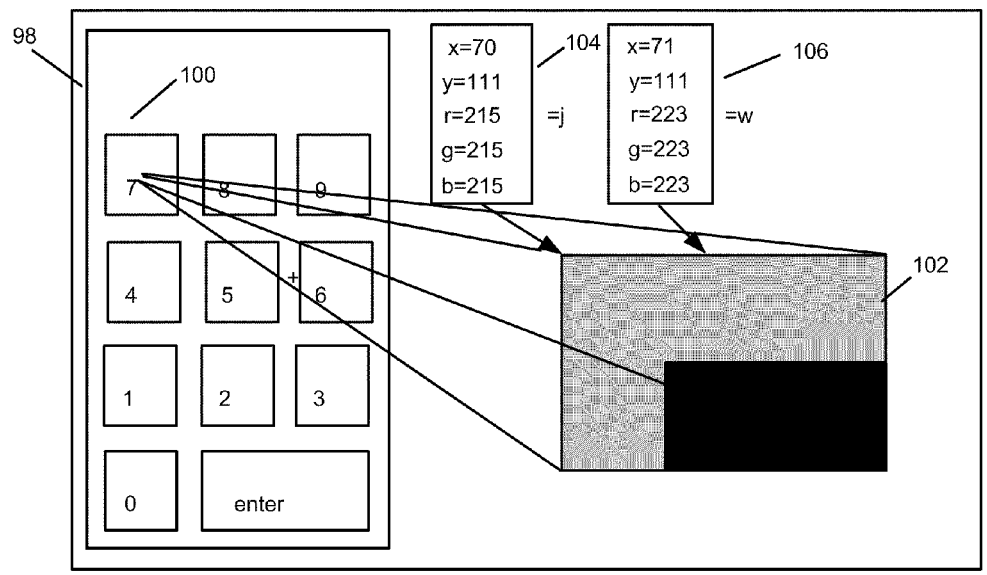
FIG. 18 illustrates a preferred, check sum type higher security keyboard graphical authentication interface according to an alternate embodiment of the present invention.

FIGS. 17 and 18 illustrate another embodiment of the present invention that is referred to the check sum type of encryption/decryption. Each pixel in an image has a unique 2 dimensional identified defined by the 'x' and 'y' values which are determined by its position in the image. The diagram depicts the RGB values of the pixels which are used to represent a sample pixel within the numeral 7 in the numeric interface. By taking the unique value of the R, G, B and adding them up with the x, y values also added to them one can find that the total value represented by an image may not be equal to another image even if there was only a slight difference in one of the R, G or B values of a pixel. As shown in FIG. 17 keypad 88 has a key 90 bearing the numeral 7 shown in a certain, predetermined color. That numeral 7 has associated with it the x and y positions and the red (R or 'r'), green (G or 'g') and blue (B or 'b') values of the color. By taking the unique value assigned to each of the R, G, B and adding those up with the x, y values, and a total value can be determined to represent that pixel. By repeating that process for each pixel, or a selected number of pixels, a total value for the image or a portion of the image can be determined. Box 92 in FIG. 17 represents six adjacent pixels, with the different shading showing some difference in at least one of the five values. As illustrated in FIG. 17, in box 94 the 'x' value assigned is '70', the assigned 'y' value is '111', the assigned red or 'r' value is '211', the assigned green or 'g' value is 211 and the assigned blue or 'b' value is '211. The total value for this pixel is represented by a 'j'. An adjacent pixel has been assigned values in the same manner, as shown in box 96, with the only difference being a change in the 'x' value by '1', for a total 'x' value of '71' thus yielding a different total value 'w' that is different by 1. Similarly, FIG. 18 illustrates a keypad image 94, and its '7' located in the same position, but with different 'r', 'g' and 'b' values, so that the total value, 'j' is different. Also, the adjacent pixel has different 'r', 'g' and 'b' values in comparison to the corresponding pixel in FIG. 17. Thus, the file size of an image may not be equal to that of another image even if there was a slight difference in one of the R, G or B values of a pixel. These variations could also be applied to gray scale images or non-RGB type images.

With respect to the file size and check sum types of encryption illustrated in FIGS. 9-10 and 17-18 the keyboard image may be distorted so that the entire image and/or the image of each individual key on the keyboard will yield a different check sum and/or file size so as to avoid identification of each individual key by sophisticated screen capture loggers.

Figure 19:
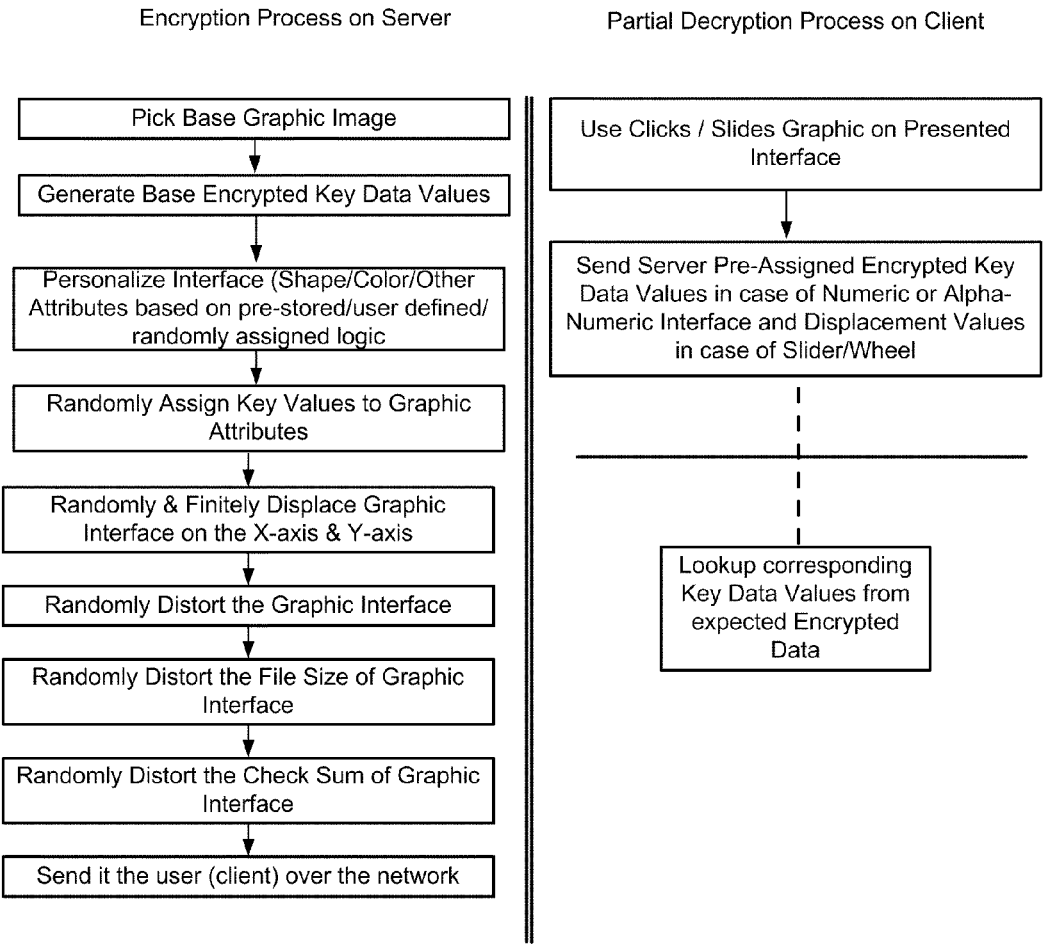
FIG. 19 is a block diagram illustrating a preferred encryption and decryption process on the user end and the server end for the embodiments of FIGS. 6-18.

FIG. 19 is a block diagram illustrating a typical implementation process for the types of encryption and decryption illustrated in FIGS. 5-18, as well as for the dynamic encryption/decryption methods and systems illustrated in FIGS. 20-21, as will be described. As shown a separate process is used on the server and on the client computer, i.e., the client end and the server end of a system for the keypad and/or keyboard graphical authentication interface embodiments shown in FIGS. 5-18. As can be seen in FIG. 19, the encryption and decryption process is asymmetrical in nature, because fewer steps are involved on the decryption side than on the encryption side.

Preferably, a three-step process is used to create the secure, unique keyboard graphical authentication interfaces of the types illustrated in FIGS. 5-18. In the first step, an encrypted key is generated and mapped to a unique graphic character of the keyboard. In the next step, the keyboard graphic image is randomly displaced within the confines of a larger X, Y-axis. In the third step, the graphical image is finitely distorted using known image processing algorithms. The levels or degrees to which these images are distorted, i.e., encrypted, are limited solely by the capacity of an end user to visually decipher the individual keyboard key images. The above encryption steps are, preferably made to be unique for each instance of use of the interface so as to increase the difficulty of deciphering the image over time.

As seen in FIG. 19, the decryption process preferably includes two steps. In the first decryption step, the user visually deciphers the encrypted keyboard (X, Y displacement and graphic distortion were the two steps used for encryption) and selects a key on the keyboard interface for entering the authentication information. In the second decryption step, the keyboard mappings are decrypted on the server by looking up the exact mappings.

Figure 20:
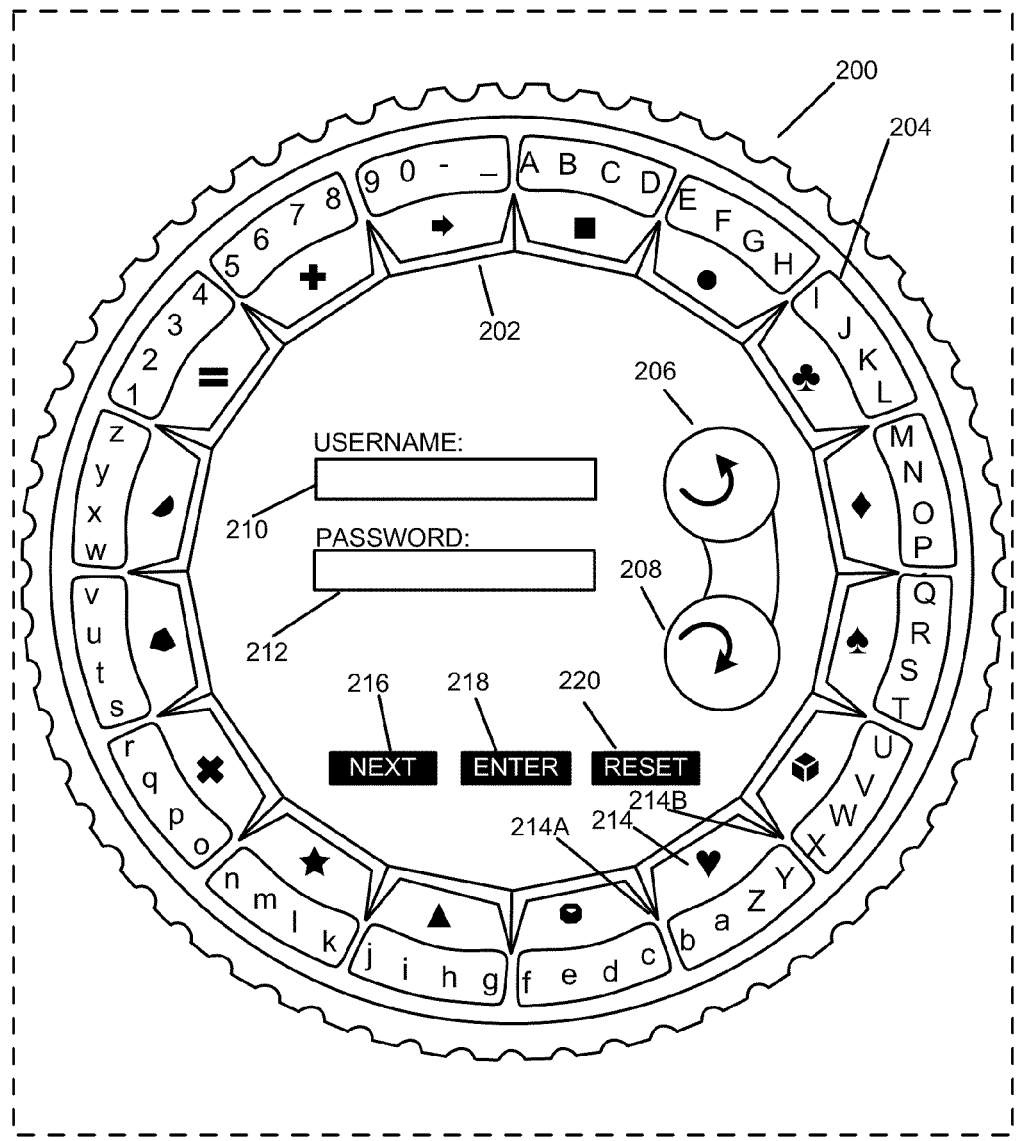
FIG. 20 illustrates a preferred, dynamic graphical wheel-type higher security keyboard graphical authentication interface according to an alternate embodiment of the present invention.

FIG. 20 illustrates a dynamic graphical wheel multi-factor interface for enabling encryption/decryption for, most preferably, authentication information that is entered into the computer system by using mouse clicks and/or keyboard navigation for aligning alphanumeric and graphic symbols according to another embodiment of the present invention. The colors/icons/shapes/forms used as markers on the wheels could also be generated based on logic which is pre-determined by the end user or decided by the service provider in advance. This enables the end user to create and thereafter identify the wheel as her or his personalized wheel. Because the user selects the marker on the fly, this embodiment is referred to as a dynamic system and method. The wheel graphical user interface (GUI) 200 shown in FIG. 20 is generated with conventional techniques on a server, and preferably includes two concentric wheels 202 and 204 for creating encryption at the point of data entry. A user simply guides reference points on the inner wheel 202 via navigational mouse clicks on a "right arrow" button 206 and/or using the keyboard for counter-clockwise rotation, and a "left arrow button" 208 for clockwise rotation, to the next element of the username field 210 or password field 212 on the outer wheel 204 in order to enter each element of data. A reference point, also referred to as a marker, positioned on the inner wheel 202 is selected by and known only to the user upon entry. Thus, the identity of a particular element of the user ID, password, etc. is indiscernible to outsiders, including being indiscernible to the various espionage software and "over-the-shoulder" spies. In other words, the user initially selects a reference point marker in his/her mind, i.e., a virtual marker. The user simply guides the selected reference point/virtual marker on the inner wheel 202 to a chosen element of the identifier, e.g., username field 210 or password field 212, on the outer wheel 204 in order to input the identifier. The identifier is also referred to herein as the code or access code. The marker is known only to the end user and remains constant for the duration of the session during which all of the elements of the identifier are entered into the system. The user begins with entry of the first element of the code, such as the user ID. Then the user enters each next element of the code in sequence. After clicking the 'ENTER' button to enter a thus encrypted element of the code, the user then clicks on the "NEXT" button. The symbols on the wheels 202 and 204 are then, preferably, randomized and the user then rotates the inner wheel 202 so that the chosen symbol on the inner wheel matches or is positioned adjacent the next element of the code in sequence, and clicks 'ENTER'. The system then transmits to the server data that corresponds to the actual degrees or rotational displacement through which the inner wheel 802 has moved from the point when the screen displays has been randomized after selection and entry of the first element until the wheel 802 has come to a standstill. In other words, the displacement information is sent to the server as degrees, or in some other form that is representative of the displacement of the wheel 802 that has taken place when the user has selected the second element. This process of clicking "NEXT", randomizing the display, rotating the inner wheel 202 to match the chosen marker to the next code element in sequence is repeated until all of the code elements for the particular identifier have been entered into the system.

The sequencing of the image symbols and marker symbols, normally hosted by the server in a database, are sent over the network in an array form to the GUI to be displayed. The server also may be programmed to apply any of the other forms of encryption, as previously described, on the symbol images before sending them through the network. It is preferable that the sequencing of the marker symbols be randomized each time an element of the code is entered into the system, and this can be done through conventional techniques. While the sequencing of the identifier elements could also be randomized, it is preferable for most applications that they not be randomized during each session.

As another embodiment, not illustrated, the set of symbols for the markers and/or the data elements could be personalized, or made unique and be based on user preferences or set by the service provider. This uniqueness further ensures that the correct authentication device/GUI is being used by the user. This optional feature virtually eliminates the possibility that an identical, illegitimate or masquerade GUI is sent to the end user by for entry of his or her credentials, authentication data or other code. In one preferred implementation, the displacements on the GUI made by user interactions are calculated or determined by shifting the index of the marker array with respect to the identifier array. The resultant displacement values of each marker index for each element are then sent over the network to the server. With the server having been programmed to know the correct code, it can then use the displacement corresponding to entry of the first element of the identifier to determine which marker the user has chosen for that session. The server can then authenticate each subsequent element by verifying that the subsequent displacements correspond only to the displacement of the marker chosen by the user for that session.

Optionally, an 'ENTER' button, as seen in FIG. 20, may be used to designate that all of the elements for the username field 210 or password field 212 have been entered. The button designators shown are exemplary only; other button designators may be used in embodiments of the invention. Alternatively, the 'ENTER' button could be eliminated in other applications. The 'ENTER' button might not be needed, for example, for systems wherein the authentication identifier, e.g., username or password, is of a predetermined, fixed length.

Also with respect to the type of encryption/decryption illustrated in FIG. 20, preferably the entered elements are not displayed in either the username field 210 or password field 212, to function as an aid in preventing an "over the shoulder" spy from viewing this information. An asterisk or other suitable symbol may be displayed in each field to signify entry of an element. For the purpose of the FIG. 20 type embodiments of the present invention, the term identifier preferably refers to a user ID, password and/or PIN. However, as described above, the term may refer to virtually any information that a user may want to encrypt and enter into the system. For example, such identifiers could include names, account numbers, social security numbers, addresses and telephone numbers. Also, as described above, the term element could be virtually any symbol recognized by the system. Typically, for use in the context of a user ID and password, the elements are alphanumeric symbols set forth in a particular sequence. For the purpose of the various embodiments of the present invention, the term marker can also refer to virtually any symbol recognized by the system. For convenience, it is preferred that the markers be non-alphanumeric symbols.

In accordance with preferred embodiments of the type as shown in FIG. 20 the server is made to pre-populate the marker arrays with randomized sequences of markers. Optionally, a plurality of sets of randomly generated marker candidates may be generated to account for the number of identifiers to be used and to provide for a number of extra sets to be available in the event of use of the RESET button, as shown but not numbered in FIG. 20, and further explained below in with reference to FIG. 21. For example, it is preferred that for a four-element identifier, such as "BANK" the number of sets of candidate markers would be at least 20, thus, providing for five resets for each marker.

Values representative of the displacement associated with the entry of each element of an identifier, as discussed above is sent to, and decoded by the server. Because the server knows the correct elements and possible marker behaviors for any specific marker picked by the user for the specific authentication information, as well as the image details, such as "jitter", file size, check sum, distortion, shift and combinations of such type of image details the server deduces the marker element based on expected logic. In such applications, the block diagram chart of FIG. 19 would also apply, but must include steps relating to and applying the wheel type encryption/decryption actions described herein.

The logic for the wheel type process is that the server, knowing the first letter of the expected identifier looks for the marker the user chose to input the first identifier element. Then the server also knows the likely marker to be used for that session. For the second, and each subsequent input of the identifiers, the server identifies and verifies that the same and correct marker is used. Thus, the system is able to determine if the user has entered the correct authentication identifier for the session. The displacement coordinates are session-specific and unusable once the session ends. As may be appreciated, such encryption and decryption always uses displacement information that is unique, randomly generated at the point of entry into the system and virtually theft-proof.

With respect to an example of the creation of multiple sets of randomized markers for each session, the FIG. 20 display shows inner wheel 202 having the first set of possible markers organized initially in random order. After each instance of input of an element of identifier data, the markers on the inner wheel are replaced with markers that have been randomized in the next set, as defined or randomized by the server, and as described above.

As an example of entry of an element of an identifier and with reference to FIG. 20, suppose the identifier of the user is the word 'BANK'. For entry of this identifier in accordance with the present invention, the user mentally selects a marker in one of the 16 delineated sections of the annular region, or sector of the interface that includes all of the markers, referred to above as the inner wheel 202. As shown in FIG. 20, sixteen such sectors are used; however, an interface having fewer or more sectors are useful and within the scope of the invention. For an application that uses sixty-identifier elements, the most preferred number of markers and, hence sectors, is sixteen.

As also shown in FIG. 20 the ♥, or 'heart' marker is located in sector 214. Sector 214 extends adjacent to and inside of outer wheel 204 from 214A to 214B. The type, nature, shape, color, configuration and number of elements and of sectors on the wheels in FIG. 20 are exemplary. Virtually any type, nature and number elements may be used, and they may have virtually an infinite number of shapes, sizes and configurations. As also shown in FIG. 20, the sector 214 of the inner wheel 202 is adjacent to a group of randomly selected identifier elements 'b a Z Y' that have been positioned in a sector of the outer wheel 804 that is radially outward of sector 214 and generally of the same shape and size. In this example, the user guides the inner wheel 202 by actuating button 206 and/or 208 so as to rotate it so that the user-chosen marker, i.e., ♥, is aligned with the first element of the identifier, i.e., the 'B'. The system is preferably programmed so that the markers can be located within a few degrees of the element of the identifier in either direction and still be considered aligned. In other words a range of distances between the user-chosen marker and each element of the identifier can be defined as acceptable. Once the alignment is reached, the user stops rotating the inner wheel 202 and clicks on the 'NEXT' button. Then the system provides the second set of the markers, i.e., the same markers, but which have been randomized by the server in regard to sequence. The system is then ready for the user to enter the next element of the identifier. Next the user again actuates button 206 and/or 208 for rotating the inner wheel to align the chosen marker with the next element, and clicking the 'NEXT' button as described above. The user then repeats this process for each of the remaining elements of the identifier so that each one is entered, one after the other, in proper sequence.

Preferably, an 'ENTER' button is provided for the user to actuate to indicate that the last element of the identifier has been input. Alternatively, the 'ENTER' button need not be used where it is not needed, e.g., where the identifier is of a predetermined, fixed length.

According to an alternate embodiment, the inner and outer wheels, and the sectors may be interchangeable. In other words, the markers may be placed on and selectable from a sector of the outer wheel, and the inner wheel would include the identifier elements. In other alternate embodiments, the outer wheel may be made rotatable.

Figure 21:
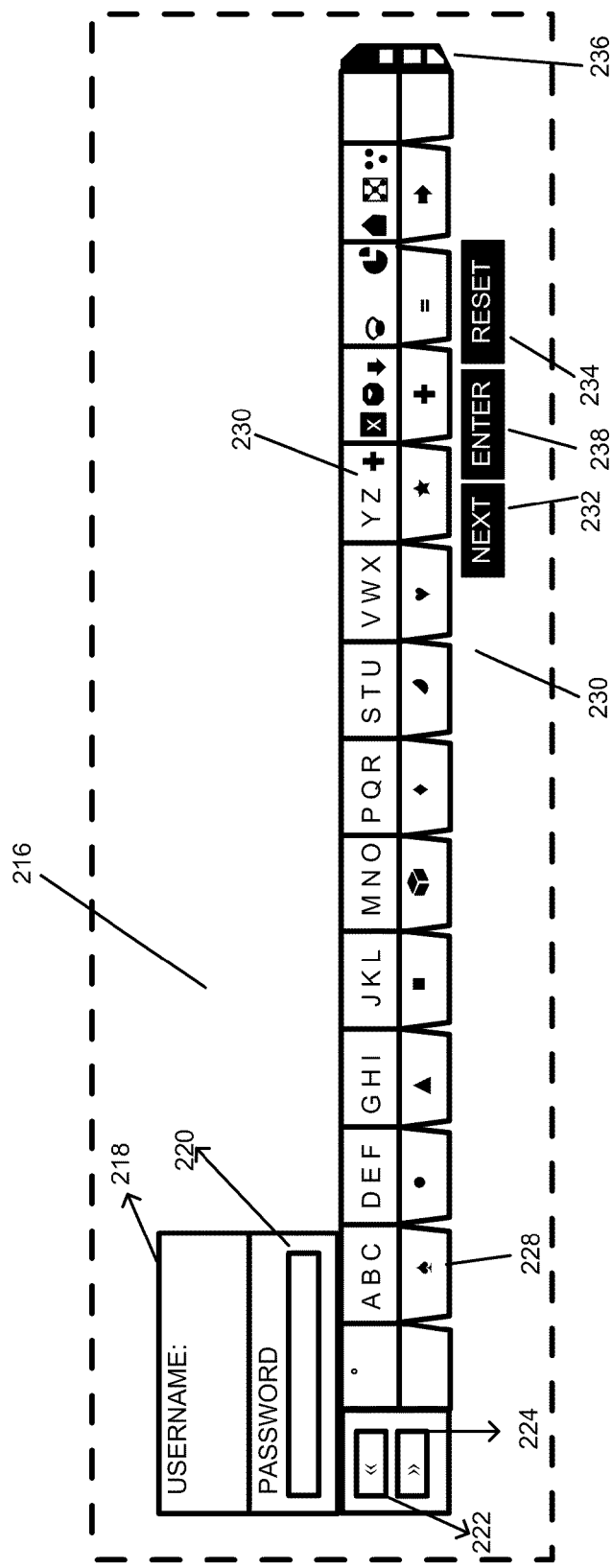
FIG. 21 illustrates a preferred, dynamic slider-type higher security keyboard graphical authentication interface according to an alternate embodiment of the present invention.

FIG. 21 illustrates another type of dynamic, graphical authentication interface in which the user chooses the markers on the fly, and relative motion of the region that includes the identifier elements relative to the motion of the markers is linear rather than rotational. The colors/icons/shapes/forms used as markers on the lower bar or the PIN assigned to the end user could also be generated based on logic that could be pre-determined by the end user or by the service provider. This also enables the end user to identify the personalized slider.

In the FIG. 21 embodiment, the interface is referred to as the slider display 216. The alphanumeric and non-alphanumeric symbols shown in FIG. 20, as well as in FIG. 21 are exemplary, i.e., other graphical symbols and images may be used to practice the invention. Also, the shape, style, configuration, coloring, orientation of the various regions may be varied, so long as relative motion between the identifier elements and markers is provided and measurable. The slider display 216 includes, optionally, a username entry field 218, password entry field 220, and selectable arrow buttons 222 and 224 for moving one part or region of the display relative to another part or region upon actuation. In the FIG. 21 embodiment, the two regions are positioned in rows, one above the other. Each region or row is divided into cells, preferably of about the same size on capable of being position one over the other. Thus the slider display 216 includes a movable lower row 226, with a plurality of cells, each cell have a marker, such as a spade or trump symbol 228, i.e., a '♠' below the letter 'B' for this example, and a fixed upper row 230. The lower row 226 is slidingly displaceable in operation through use of navigational mouse clicks on the 'left arrow' button 222 and 'right arrow' button 224. Displacement of the moveable lower row 226 of the slider display 216 is measured relative to the fixed upper row 230 in the same manner as is the displacement of the wheel embodiment shown in FIG. 20 and discussed above, except that the displacement of this type of display is linear rather than radial. The displacement value for each instance of entering an identifier element into the system is sent to and decoded by the server once the user signifies input of the data by using the 'NEXT' button 232. Thus, the acts of transmission of displacement information to the server for the slider display 216 is analogous to that of the wheel embodiment of FIG. 20, except that the slider display 216 displacement is linear and the wheel display 200 displacement is rotational.

A 'RESET' button 234 is preferably provided to enable a user to restart entry of the username, password or other identifier or code. A similar reset capability may also be used with other embodiments, such as with that shown, but not numbered in FIG. 20. Icons 236 are provided, optionally, and preferably in the image for displaying the status of entry of elements of the identifier field to indicate how many elements of the username or password have been entered. Preferably the entered elements are not displayed in either the username field 218 or password field 220 as an aid in preventing an "over the shoulder" spy from viewing the field information. Alternatively, an asterisk can be shown in the entry input portions to signify entry of each element.

According to an alternate embodiment, the rows shown in FIG. 21 may be interchanged, that is, the marker may be made to be selectable from the top row, which may be made to be slideable by the user for guiding the marker, and the bottom row may be made to include the possible elements of the identifier.

Alternatively, the elements and/or markers on the wheel of FIG. 20, and the elements and/or markers in the rows of FIG. 21 may be customized for a user, e.g., pictures of animals, people, scenes or any other images. Alternatively the markers could use a logic which is known by the user and pre-defined by the server.

The user interfaces in FIGS. 20 and 21 are shown with two identifiers, e.g., username and password. However, the present invention is not limited to two factors; additional factors may be included within the scope of the present invention. For example, a PIN code could be added to make the encryption/decryption system be a three-identifier system.

Each of the graphical interfaces shown in the above figures are preferably generated and sent to the user device using conventional software known to one of ordinary skill in the art, e.g., MACROMEDIA FLASH brand software or JAVA brand software or using SVG standards. In a preferred embodiment, FLASH software is used for generating the graphical interfaces.

Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Figure 22:
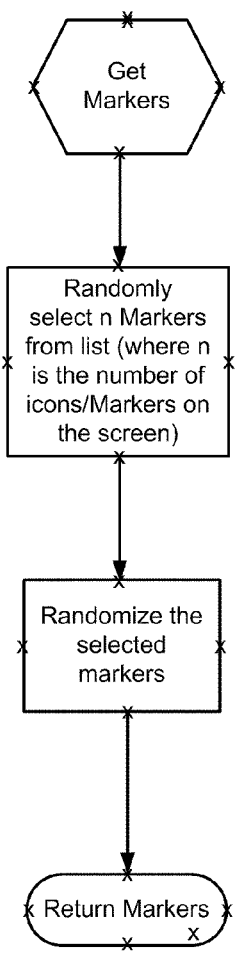
FIG. 22 is a block diagram illustrating a preferred encryption and decryption process for non-user personalized markers embodiments of the present invention.
Figure 23:
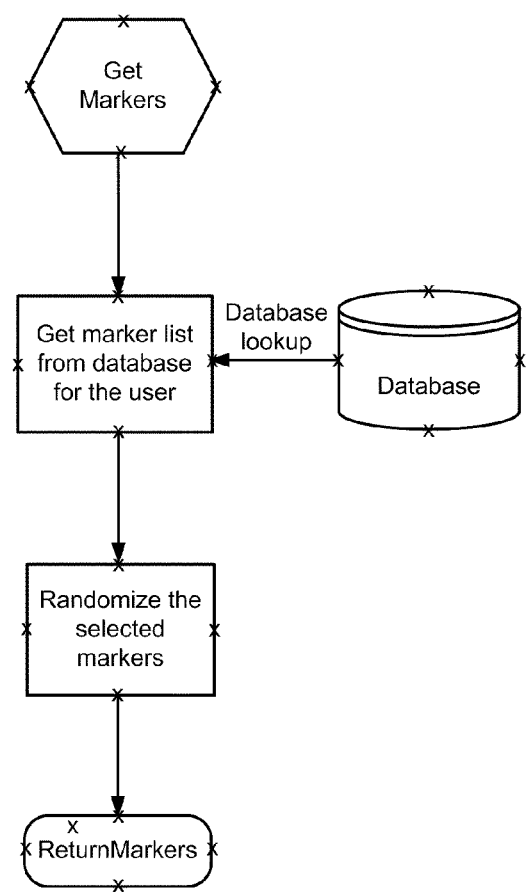
FIG. 23 is a block diagram illustrating a preferred encryption and decryption process for user personalized markers embodiments of the present invention.
Figure 24:
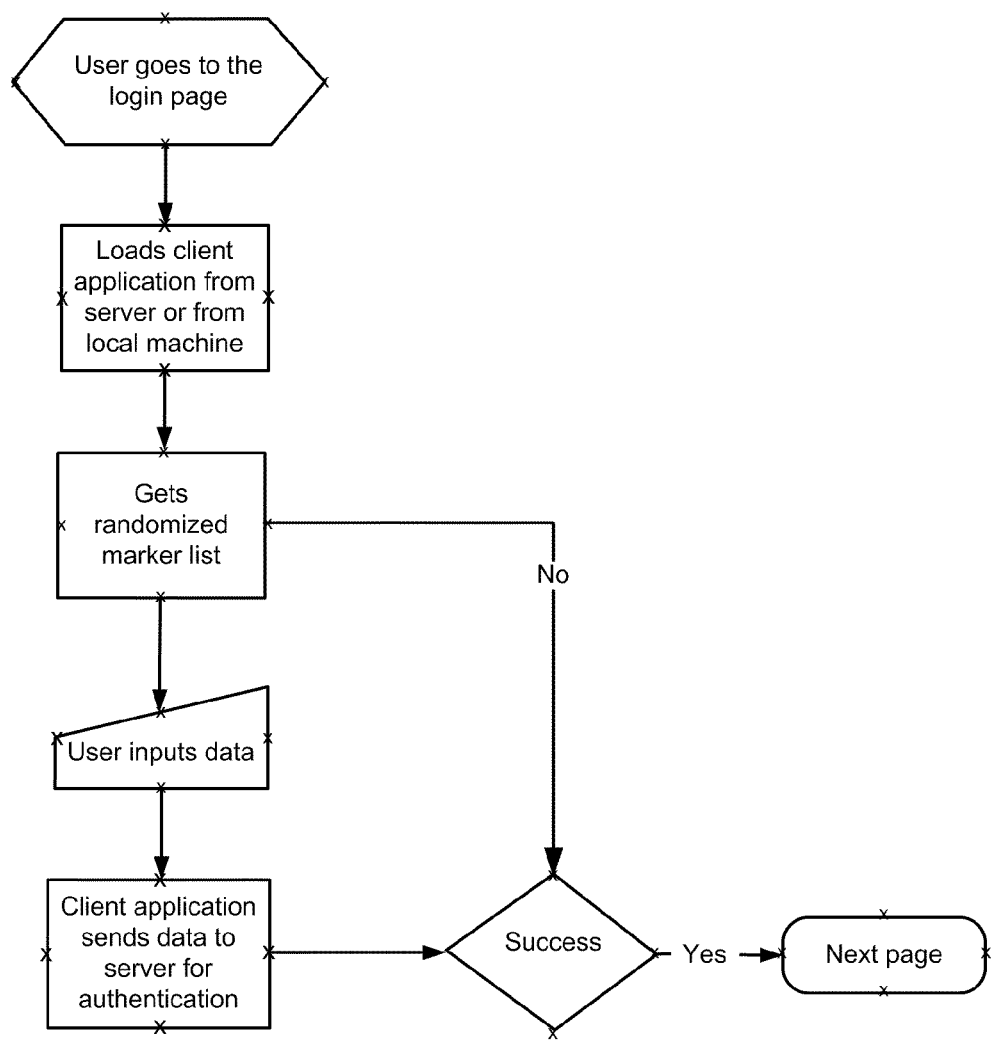
FIG. 24 is a block diagram illustrating a preferred client process flow for encryption and decryption for use in embodiments of the present invention.

With reference to FIGS. 22-29 block diagrams of various process features of the present invention will be described. In FIG. 22 the server gets non user personalized markers for use in and as shown in the FIG. 20 or 21 embodiments, and randomly selects some number 'n' of markers from the list of available markers and then returns the markers to the client computer's display. As shown in FIG. 23, essentially the same process is used, except that in getting the markers a database that contains user personalized markers is accessed and sets of those markers are selected and randomized prior to returning the sets of markers to the client computer. A preferred process flow at the client computer is illustrated in the FIG. 24 block diagram, where the process begins with the user going to the login page. Then the client loads the application from the server, or from the local machine, and retrieves one of the randomized marker lists. The user then inputs the elements of the identifier or other code and the client computer then transmits the data over the network to the server. The server then processes the data, and if data entry was successful for that identifier, goes to the next page. If not successful, the server returns control back to the client computer to get another randomized marker list and continue the process as before.

Figure 25:
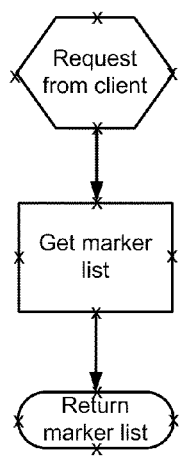
FIG. 25 is a block diagram illustrating a prior art client/server interaction for an authentication process.
Figure 26:
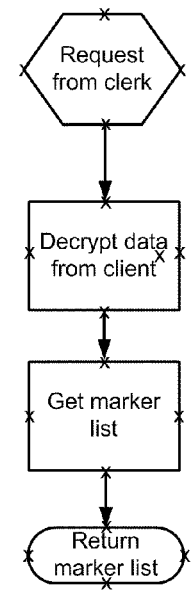
FIG. 26 is a block diagram illustrating a preferred client/server interaction with encryption and for use in embodiments of the present invention.
Figure 27:
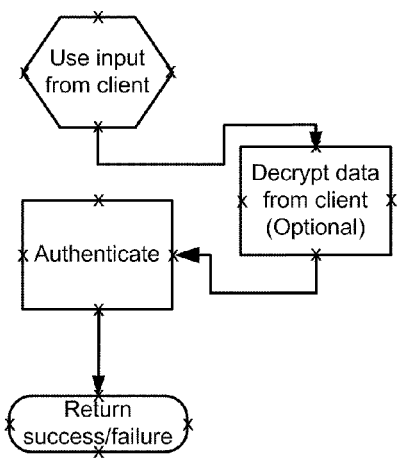
FIG. 27 is a block diagram illustrating an authentication process.
Figure 28:
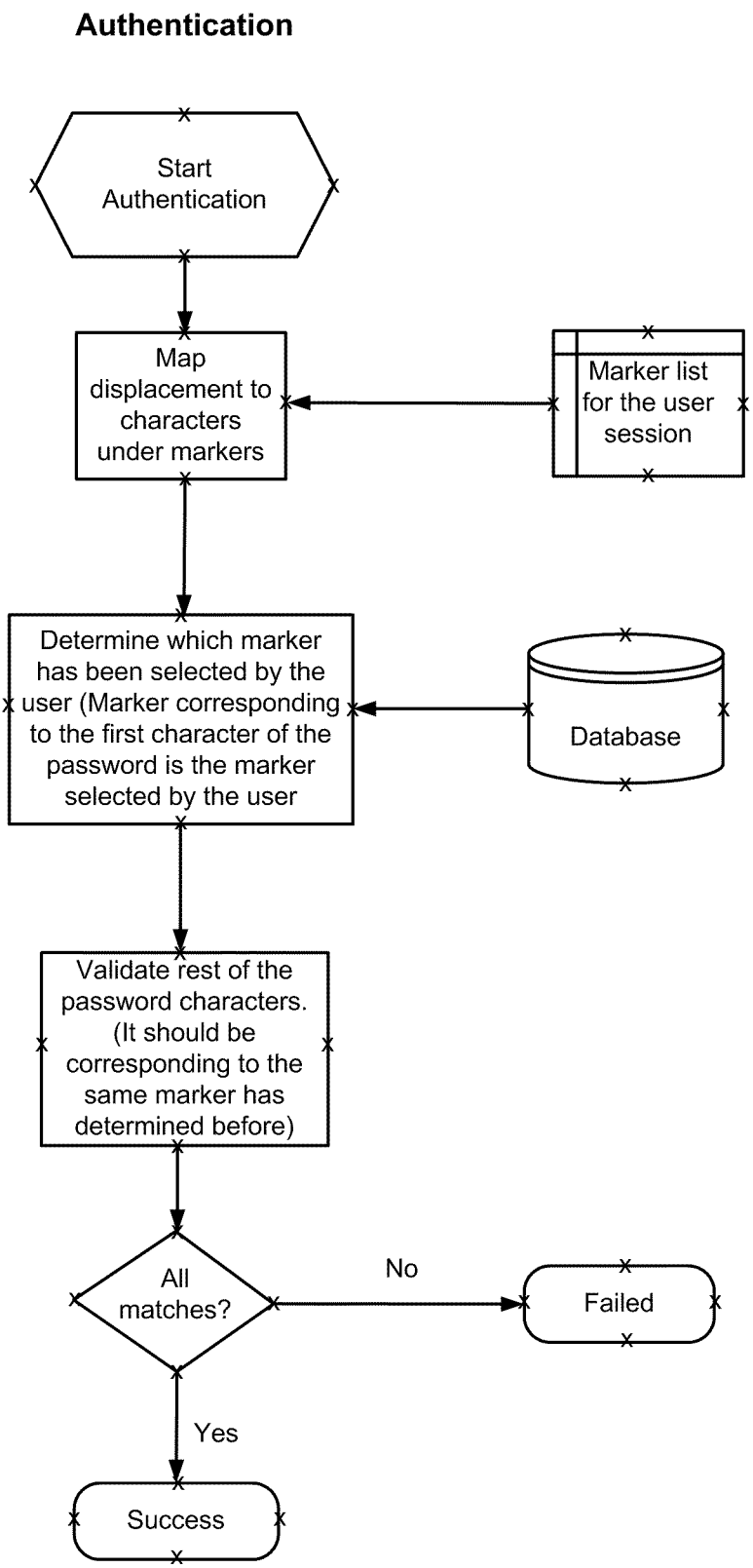
FIG. 28 is a block diagram illustrating a preferred authentication process for use in embodiments of the present invention.

FIG. 25 is a block diagram that illustrates the client/server interaction that takes place without encryption, and FIG. 26 illustrates that interaction with encryption. In FIG. 25 the client computer make a request and the server gets the market list and returns the list to the client. In FIG. 26 a similar interaction takes place, but in addition the server decrypts the data received from the client prior to getting the marker list and returning the marker list to the client. FIG. 27 illustrates the authentication interaction, where, once the data received from the client has been, optionally, decrypted, authentication of that data is performed and then the server returns a success or failure instruction to the client. In FIG. 28 the authentication process is detailed, so that upon starting the process, mapping displacement to characters under the markers takes place, using the marker list chosen for that session.

Then a determination on which marker has been selected by the user for the first element of the identifier, such as a password, is made, using the password stored in the database as a basis for the tentative determination. Next the system validates the rest of the identifier elements by comparing the displacements made by the marker and whether the correct element of the identifier has been matched for each element in sequence. If all correct matches were made, then the server sends a 'success' instruction to indicate that authentication was successful. If not all correct matches were made, the server sends a 'failed' instruction and the process resumes.

As an example of the code that could be used for the type of mappings used in the embodiments of FIGS. 6-19, FIG. 29 provides some typical, preferred pseudo source code that could be used. However, with respect to the coding needed to implement the features of the present invention herein described with reference to the figures, it is believed that all such coding is within the ordinary skill of the art in this field, and that specific applications could be readily provided.

What is claimed is:

1. A non-transitory computer readable storage medium having stored thereon program code executable by a computer system, the program code comprising:
   code that causes the computer system to send, to a user computer, a graphical interface comprising a set of alphanumeric symbols and session-based mapping instructions that uniquely between authentication sessions handed by the computer server correlate each alphanumeric symbol of the graphical interface with a corresponding symbol;
   code that causes the computer system to receive, from the user computer, encrypted authentication data comprising a sequence of symbols different from authentication data for a user, wherein the encrypted authentication data is generated by the user computer in response to:
      receiving, via the graphical interface, a sequence of alphanumeric symbols from the user corresponding to the authentication data for the user; and
      generating the sequence of symbols of the encrypted authentication data based on the sequence of alphanumeric symbols of the graphical interface and the mapping instructions; and
   code that causes the computer system to decrypt the encrypted authentication data to obtain the authentication data for the user.

2. The computer readable storage medium of claim 1 wherein the corresponding symbols of the mapping instructions are randomly generated by the computer system.

3. The computer readable storage medium of claim 1 wherein the graphical interface is an image of a distorted keypad or keyboard.

4. The computer readable storage medium of claim 1 wherein the graphical interface is personalized for the user by the computer system in response to identification information sent by the user computer.

5. A non-transitory computer readable storage medium having stored thereon program code executable by a computer system, the program code comprising:
   code that causes the computer system to send, at a time of a first authentication session, a graphical interface to a user computer, wherein the graphical interface comprises a plurality of user interface elements operable by a user of the user computer to enter authentication information to be sent to the computer system, and wherein overall layout of the plurality of user interface elements of the graphical interface is distorted during the first authentication session in a first manner on a display of the user computer; and
   code that causes the computer system to send, at a time of a second authentication session, the graphical interface to the user computer, wherein the overall layout of the plurality of user interface elements of the graphical interface is distorted during the second authentication session in a second manner on the display of the user computer that is distinct from the first manner.

6. The non-transitory computer readable storage medium of claim 5 wherein the overall layout of the plurality of user interface elements of the graphical interface is displayed at a different location on the display each time an element of authentication data is entered into the user computer.

7. A method for providing an authentication interface, the method comprising:
   sending, from a server to a user computer, a graphical interface comprising a set of alphanumeric symbols and session-based mapping instructions that uniquely between authentication sessions handed by the computer server correlate each alphanumeric symbol of the graphical interface with a corresponding symbol;
   receiving, at the server from the user computer, encrypted authentication data comprising a sequence of symbols different from authentication data for a user, wherein the encrypted authentication data is generated by the user computer in response to:
      receiving, via the graphical interface, a sequence of alphanumeric symbols from the user corresponding to the authentication data for the user; and
      generating the sequence of symbols of the encrypted authentication data based on the sequence of alphanumeric symbols of the graphical interface and the mapping instructions; and
   decrypting, at the server, the encrypted authentication data to obtain the authentication data for the user.

8. The method of claim 7 wherein the corresponding symbols of the mapping instructions are randomly generated by the server.

9. The method of claim 7 wherein the graphical interface is an image of a distorted keypad or keyboard.

10. The method of claim 7 wherein the graphical interface is personalized for the user by the server in response to receiving identification information.

11. A method for providing an authentication interface, the method comprising:
   at a time of a first authentication session, sending a graphical interface from a server to a user computer, wherein the graphical interface comprises a plurality of user interface elements operable by a user of the user computer to enter authentication information to be sent to the server, and wherein overall layout of the plurality of user interface elements of the graphical interface is distorted during the first authentication session in a first manner on a display of the user computer; and
   at a time of a second authentication session, sending the graphical interface again from the server to the user computer, wherein the overall layout of the plurality of user interface elements of the graphical interface is distorted during the second authentication session in a second manner on the display of the user computer that is distinct from the first manner.

12. The method of claim 11 wherein the overall layout of the plurality of user interface elements of the graphical interface is displayed at a different location of the display each time an element of authentication data is entered.

13. The method of claim 11 wherein the plurality of user interface elements include an arrangement of buttons.

14. The method of claim 13 wherein the arrangement of buttons comprises a keypad or keyboard.

15. The method of claim 11 wherein the overall layout of the plurality of user interface elements is distorted in size, shape, encoding, or content.

16. The method of claim 11 wherein the overall layout of the plurality of user interface elements is displaced to different x,y positions on a display.

17. The method of claim 11 wherein the overall layout of the plurality of user interface elements is distorted through jittering changing spatial position, content, or checksum values.

* * * * *

UNITED STATES PATENT AND TRADEMARK OFFICE
CERTIFICATE OF CORRECTION

| | | |
|---|---|---|
| PATENT NO. | : 8,484,455 B2 | Page 1 of 1 |
| APPLICATION NO. | : 12/882096 | |
| DATED | : July 9, 2013 | |
| INVENTOR(S) | : Varghese et al. | |

It is certified that error appears in the above-identified patent and that said Letters Patent is hereby corrected as shown below:

In the Drawings

On sheet 9 of 34, in figure 19, in box 3, line 3, delete "logic" and insert -- logic) --, therefor.

On sheet 12 of 34, in figure 23, line 9, delete "ReturnMarkers" and insert -- Return Markers --, therefor.

On sheet 15 of 34, in figure 28, line 12, delete "user" and insert -- user) --, therefor.

In the Specification

In column 8, line 2, delete "IO" and insert -- I/O --, therefor.

In column 8, line 4, delete "kernels)" and insert -- kernel(s) --, therefor.

Signed and Sealed this
First Day of September, 2015

Michelle K. Lee
*Director of the United States Patent and Trademark Office*